US010461412B2

(12) United States Patent
Li et al.

(10) Patent No.: US 10,461,412 B2
(45) Date of Patent: Oct. 29, 2019

(54) MICROWAVE MODULATION DEVICE

(71) Applicant: InnoLux Corporation, Miao-Li County (TW)

(72) Inventors: I-Yin Li, Miao-Li County (TW); Yi-Hung Lin, Miao-Li County (TW); Chia-Chi Ho, Miao-Li County (TW); Li-Wei Sung, Miao-Li County (TW); Ming-Yen Weng, Miao-Li County (TW); Hung-I Tseng, Miao-Li County (TW); Kuo-Chun Lo, Miao-Li County (TW); Charlene Su, Miao-Li County (TW); Ker-Yih Kao, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/906,126

(22) Filed: Feb. 27, 2018

(65) Prior Publication Data

US 2018/0375202 A1    Dec. 27, 2018

Related U.S. Application Data

(60) Provisional application No. 62/542,897, filed on Aug. 9, 2017, provisional application No. 62/542,373, filed (Continued)

(30) Foreign Application Priority Data

Nov. 28, 2017   (CN) .......................... 2017 1 1215081

(51) Int. Cl.
*H01Q 1/00*   (2006.01)
*H01Q 1/40*   (2006.01)
(Continued)

(52) U.S. Cl.
CPC ................ *H01Q 1/40* (2013.01); *H01Q 1/38* (2013.01); *H01Q 3/44* (2013.01); *H01Q 9/0407* (2013.01);
(Continued)

(58) Field of Classification Search
CPC .. H01Q 1/2266; H01Q 1/2275; H01Q 1/2283; H01Q 1/24; H01Q 1/241;
(Continued)

(56) References Cited

U.S. PATENT DOCUMENTS

2015/0053968 A1   2/2015  Misaki et al.
2018/0182556 A1*  6/2018  Linn .................. H01G 4/30

FOREIGN PATENT DOCUMENTS

WO         2017061527 A1      4/2017

OTHER PUBLICATIONS

EP Search Report dated Oct. 9, 2018 in European application (No. 18172537.5-1205).

* cited by examiner

*Primary Examiner* — Binh B Tran
(74) *Attorney, Agent, or Firm* — McClure, Qualey & Rodack, LLP

(57) ABSTRACT

A microwave modulation device includes a first radiator, a second radiator and a modulation structure. The first radiator includes a substrate; a metal layer disposed on the substrate; a protective layer disposed on at least a portion of the metal layer and including a through hole overlapping with at least a portion of the metal layer; and an etch stop layer disposed between the metal layer and the protective layer. The second radiator disposed corresponding to the first radiator. The modulation structure is disposed between the first radiator and the second radiator.

19 Claims, 21 Drawing Sheets

Related U.S. Application Data on Aug. 8, 2017, provisional application No. 62/523,336, filed on Jun. 22, 2017.

(51) Int. Cl.
- *H01Q 3/44* (2006.01)
- *H01Q 9/04* (2006.01)
- *H01Q 13/10* (2006.01)
- *H01Q 1/38* (2006.01)
- H01Q 1/50 (2006.01)
- H01Q 1/22 (2006.01)
- H01Q 1/24 (2006.01)
- G02F 1/13 (2006.01)

(52) U.S. Cl.
CPC .......... *H01Q 9/0457* (2013.01); *H01Q 13/10* (2013.01); *G02F 1/1313* (2013.01); *H01Q 1/2266* (2013.01); *H01Q 1/2275* (2013.01); *H01Q 1/2283* (2013.01); *H01Q 1/24* (2013.01); *H01Q 1/241* (2013.01); *H01Q 1/50* (2013.01)

(58) Field of Classification Search
CPC .......... H01Q 1/242; H01Q 1/243; H01Q 1/46; H01Q 1/50
USPC .................................................. 343/904–906
See application file for complete search history.

MICROWAVE MODULATION DEVICE

CROSS-REFERENCE TO RELATED APPLICATIONS

This application claims the benefit of U.S. Provisional Application No. 62/523,336, filed on Jun. 22, 2017, No. 62/542,373, filed on Aug. 8, 2017, and No. 62/542,897, filed on Aug. 9, 2017, the entirety of which are incorporated by reference herein. This Application claims priority of China Patent Application No. 201711215081.7 filed on Nov. 28, 2017, the entirety of which is incorporated by reference herein.

BACKGROUND

Field of the Disclosure

The present disclosure relates to a microwave device, and in particular to a microwave modulation device.

Description of the Related Art

In microwave modulation devices, liquid-crystal antenna units are utilized. The rotation of the liquid-crystal units can be controlled by an electric field, and thus the dielectric constants of the liquid-crystal antenna units can be changed according to the characteristics of the double dielectric constants of the liquid-crystal units. Moreover, the arrangement of the liquid-crystal units is controlled by electrical signals so as to change the dielectric constant of each unit of the microwave systems. Therefore, the phases or amplitudes of the microwave signals of the microwave modulation device can be controlled. The transmitting directions of the wavefronts emitted by the microwave modulation device are defined as the directions of maximum intensity of radiation pattern of the microwave modulation device.

By controlling the radiation direction of the microwave modulation device, the strongest microwave signals can be searched for. The receiving or radiation directions can be adjusted according to the signal source, and thus the communication quality is enhanced. The signal source can be a satellite in space, a base station on the ground, or another signal source.

Wireless communication via microwave modulation devices can be used in many different kinds of vehicles, such as airplanes, yachts, ships, trains, cars, and motorcycles, or applied to the internet-of-things (IoT), autopilots, or autonomous vehicles. Electronic microwave modulation devices have many advantages over conventional mechanical antennas, such as being flat, lightweight, and thin, and having a short response time.

Although existing microwave modulation devices have been generally adequate for their intended purposes, they have not been entirely satisfactory in all respects. Consequently, it is desirable to provide a solution for improving microwave modulation devices.

BRIEF SUMMARY

The disclosure provides a microwave modulation device including a first radiator, a second radiator, and a modulation structure. The first radiator includes a substrate; a metal layer disposed on the substrate; a protective layer disposed on a portion of the metal layer, and having a through hole, wherein the through hole overlaps with a portion of the metal layer; and an etch-stop layer disposed between the metal layer and the protective layer. The second radiator is disposed corresponding to the first radiator. The modulation structure is disposed between the first radiator and the second radiator.

The disclosure provides a microwave modulation device including a first radiator, a second radiator, and a modulation structure. The first radiator includes a substrate; a buffer layer disposed on the substrate; a metal layer disposed on the buffer layer; a protective layer disposed on a portion of the metal layer, and having a through hole; and an etch-stop layer disposed between the metal layer and the buffer layer. The second radiator is disposed corresponding to the first radiator. The modulation structure is disposed between the first radiator and the second radiator. The through hole exposes a portion of the etch-stop layer.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
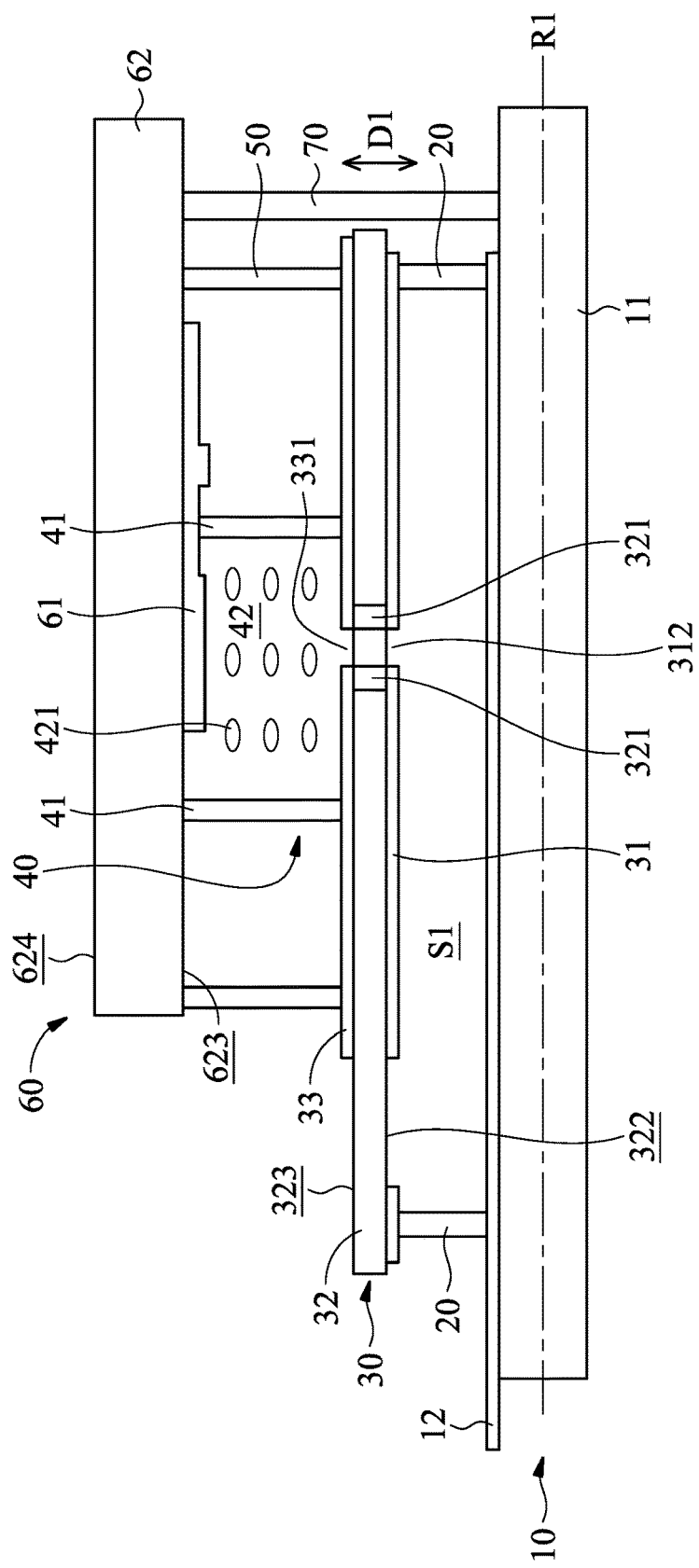
FIG. 1 is a schematic view of a microwave modulation device in accordance with a first embodiment of the disclosure.

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

The words, such as "first" or "second", in the specification are for the purpose of clarity of description only, and are not relative to the claims or meant to limit the scope of the claims. In addition, terms such as "first feature" and "second feature" do not indicate the same or different features.

Spatially relative terms, such as upper and lower, may be used herein for ease of description to describe one element or feature's relationship to other elements or features as illustrated in the figures. The spatially relative terms are intended to encompass different orientations of the device in use or operation in addition to the orientation depicted in the figures. The shape, size, thickness and inclined angle depicted in the drawings may not be drawn to scale or may be simplified for clarity of discussion; these drawings are merely intended for illustration.

It should be understood that additional operations can be provided before, during, and after the method, and some of the operations described can be replaced or eliminated for other embodiments of the method.

FIG. 1 is a schematic view of a microwave modulation device 1 in accordance with a first embodiment of the disclosure. The microwave modulation device 1 can be a liquid-crystal antenna device. The microwave modulation device 1 is configured to emit microwave signals. The frequency range of microwave signals is in a range from about 300 MHz to 300 GHz. In another embodiment, the frequency range of the microwave signals is in a range from about 10 GHz to 40 GHz.

The microwave modulation device 1 includes a radiator 10, a support structure 20, a radiator 30, a modulation structure 40, a sealing wall 41, a support structure 50 and a radiator 60. The radiator 10 extends along a reference plane R1. The support structure 20 is disposed on the radiator 10. The radiator 30 is disposed on the support structure 20. The radiator 30 may be parallel to the radiator 10.

A microwave-transmission layer S1 is located between the radiator 10 and the radiator 30, and the microwave-transmission layer S1 is configured for transmitting microwave signals. In some embodiments, the microwave-transmission layer S1 is gas, substantially vacuum, liquid, insulating materials, other mediums suitable for the microwave-transmission layer, or a combination thereof.

The radiator 10 includes a substrate 11 and a transmitting layer 12. The substrate 11 extends along the reference plane R1. The substrate 11 includes rigid materials. In some embodiments, the substrate 11 includes glass materials, metal materials, plastic materials, or other insulation materials, but it is not limited thereto.

The transmitting layer 12 is disposed on the substrate 11. The transmitting layer 12 may be a thin film structure. The transmitting layer 12 includes metal materials, conductive materials, other materials suitable for the transmitting layer, or a combination thereof. In some embodiments, the transmitting layer 12 covers over ½ or ⅓ of the area of the substrate 11. In some embodiments, the transmitting layer 12 covers over ⅘ of the area of the substrate 11. In some embodiments, the transmitting layer 12 is grounding. It should be noted that if the substrate 11 includes metal materials, and the transmitting layer 12 and the substrate 11 may be formed as a single piece.

The support structure 20 is disposed on the radiator 10, and connected to the radiator 30. In other words, the support structure 20 is located between the radiator 10 and the radiator 30. In this embodiment, the support structure 20 is disposed on the transmitting layer 12. In another embodiment, the support structure 20 is disposed on the substrate 11.

The support structure 20 extends along a stacking direction D1. The stacking direction D1 is perpendicular to the reference plane R1. In other words, the stacking direction D1 is also the normal direction of the substrate 11. In some embodiments, the support structure 20 includes insulation materials, rigid materials, or rigid insulation materials.

The support structure 20 is configured to separate the radiator 10 from the radiator 30, and to maintain the distance between the radiator 10 and the radiator 30, so as to form the microwave-transmission layer S1 between the radiator 10 and the radiator 30. In some embodiments, the support structure 20, the transmitting layer 12, and the substrate 11 are formed as a single pieces.

The radiator 30 includes a transmitting layer 31, a substrate 32, and a radiation-signal layer 33. The transmitting layer 31 is disposed on the first surface 322 of the substrate 32. The transmitting layer 31 may be a thin film structure, and cover over ⅔ area of the first surface 322 of the substrate 32. The transmitting layer 31 may include metal materials, conductive materials, other materials that are suitable for the transmitting layer, or a combination thereof. Moreover, the transmitting layer 31 has an opening area 312. In some embodiments, the transmitting layer 31 may be omitted. The microwave signals are transmitted from the transmitting layer 12 to the radiation-signal layer 33 via the microwave-transmission layer S1 and the substrate 32. The substrate 32 is substantially parallel to the substrate 11, and separated from the substrate 11. In some embodiments, the substrate 32 includes glass materials, polyimide (PI), liquid-crystal polymer other insulation materials, or other suitable materials for substrate, but it is not limited thereto.

The substrate 32 may have connection holes 321 arranged around the opening area 312. The connection hole 321 is filled with conductive materials. The conductive materials fully fills the connection holes 321, or partially fills the connection holes 321, such as coating on a portion of the inner walls of the connection holes 321. Therefore, the radiation-signal layer 33 is connected to the transmitting layer 31 via the conductive materials in the connection hole 321.

The radiation-signal layer 33 is disposed on a second surface 323 of the substrate 32 opposite to the first surface 322. The radiation-signal layer 33 may be a thin film structure. The radiation-signal layer 33 covers the connection holes 321. In this embodiment, the connection holes 321 are filled with conductive materials. The radiation-signal layer 33 is electrically connected to the transmitting layer 31 via the conductive materials. The radiation-signal layer 33 includes many opening areas 331 located over the opening area 312 of the transmitting layer 31.

Due to the transmitting layer 31 being electrically connected to the radiation-signal layer 33 via the conductive materials in the connection holes 321, the interference between microwave signals is decreased when the microwave signals pass through the opening area 312 and the opening area 331. Therefore, the tuning range of the microwave modulation device 1 is improved.

The modulation structure 40 is located between the radiator 30 and the radiator 60. The modulation structure 40 is located above the opening area 331 and overlaid on the opening area 331. In this embodiment, the opening area 331 is located under the central area of the modulation structure 40.

The modulation structure 40 includes the modulation materials 42. The modulation materials 42 may be liquid-crystal materials, and the modulation materials 42 may include modulation molecules 421. In this embodiment, the modulation molecules 421 are liquid-crystal molecules.

A sealing wall 41 is disposed between the radiator 30 and the radiator 60. The sealing wall 41, the radiator 30 and the radiator 60 forms a space for receiving the modulation materials 42, wherein the sealing wall 41 may be a closed loop structure, such as a ring-shaped structure or a polygonal structure. In some embodiments, the sealing wall 41 may include insulation materials or conductive materials. In some embodiments, the sealing wall 41 may include plastic-like materials or plastic materials. The plastic-like materials or plastic materials may include but not limited to a single material or a composite layer of materials, such as Polyethylene Terephthalate (PET), Polyethylene (PE), Polyethersulfone (PES), Polycarbonate (PC), Polymethylmethacrylate (PMMA), or glass. When the modulation materials 42 are liquid-crystal materials, the sealing wall 41 surrounds the liquid-crystal materials, and is configured to prevent the liquid-crystal materials from flowing out.

The support structure 50 is connected to the radiator 30 and the radiator 60, and extends along the stacking direction D1. In other words, the support structure 50 is located between the radiator 30 and the radiator 60. The radiator 60 includes a radiation-signal layer 61 and a substrate 62. The support structure 50 is disposed on the radiation-signal layer 33, and under the substrate 62. In some embodiments, the support structure 50 is disposed on the substrate 32. The support structure 50 is configured to enhance the structure of the microwave modulation device 1, and maintain the distance between the radiator 30 and the radiator 60.

The support structure 50 may include insulation materials or conductive materials. In some embodiments, the support structure 50 may include copper, silver, gold, or alloys thereof. In some embodiments, the support structure 50 may include of plastic-like materials or plastic materials. The plastic-like materials or plastic materials may include but not limited to a single material or a composite layer of materials, such as Polyethylene Terephthalate (PET), Polyethylene (PE), Polyethersulfone (PES), Polycarbonate (PC), Polymethylmethacrylate (PMMA), or glass.

The radiator 60 is disposed on the modulation structure 40 and the support structure 50. The radiator 60 is substantially parallel to the radiator 30, and separated from the radiator 30.

The radiation-signal layer 61 is disposed on the modulation structure 40. The radiation-signal layer 61 may be a thin film structure, disposed on a third surface 623 of the substrate 62 facing to the radiator 30 (the substrate 32). A portion of the radiation-signal layer 61 extends out of the sealing wall 41. The microwave modulation device 1 can emit microwave signals via the radiation-signal layer 61.

The substrate 62 is disposed on the radiation-signal layer 61, and includes a fourth surface 624 opposite to the third surface 623. The substrate 62 is parallel to the substrate 32, and separated from the substrate 32. In some embodiments, the substrate 62 may include glass materials, polyimide (PI), liquid-crystal polymer, or other insulation materials, but it is not limited thereto.

In this embodiment, the microwave signals can be fed into the microwave modulation device 1 via a waveguide structure formed by the microwave-transmission layer S1 between the transmitting layer 12 and the transmitting layer 31. The microwave signals are transmitted in the microwave-transmission layer S1 between the transmitting layer 12 and the transmitting layer 31, and transmitted to the radiation-signal layer 61 via the opening area 312, the opening area 331, and the modulation structure 40. The microwave signals in the modulation structure 40 can be emitted from the radiation-signal layer 61 to the outside of the microwave modulation device 1 or not, which is determined by the equivalent circuit formed by the radiation-signal layer 33, the radiation-signal layer 61 and the modulation structure 40.

The modulation-control signals can be fed into the microwave modulation device 1 via the radiation-signal layer 61. Since the modulation structure 40 (such as, the rotation angles of the modulation molecules 421) can be controlled by the modulation-control signals, the modulation molecules 421 can alternately allow or block the microwave signals in the modulation structure 40 transmitted to the radiation-signal layer 61. Therefore, the transmission speed of the microwave signals in the modulation structure 40 can be changed by adjusting the inclined angles of the modulation molecules 421, and thus the phase of the microwave signals can be changed.

The microwave modulation device 1 further includes a support structure 70 connected to the radiator 10 and the radiator 60. In other words, the support structure 70 is located between the radiator 10 and the radiator 60. In this embodiment, the support structure 70 is connected to the substrate 11 and the substrate 62. The support structure 70 is configured to enhance the structure of the microwave modulation device 1, and maintain the distance between the radiator 10 and the radiator 60.

The support structure 70 may include conductive materials or insulation materials. The support structure 70 includes copper, silver, gold, or alloys thereof, but it is not limited thereto.

Figure 2:
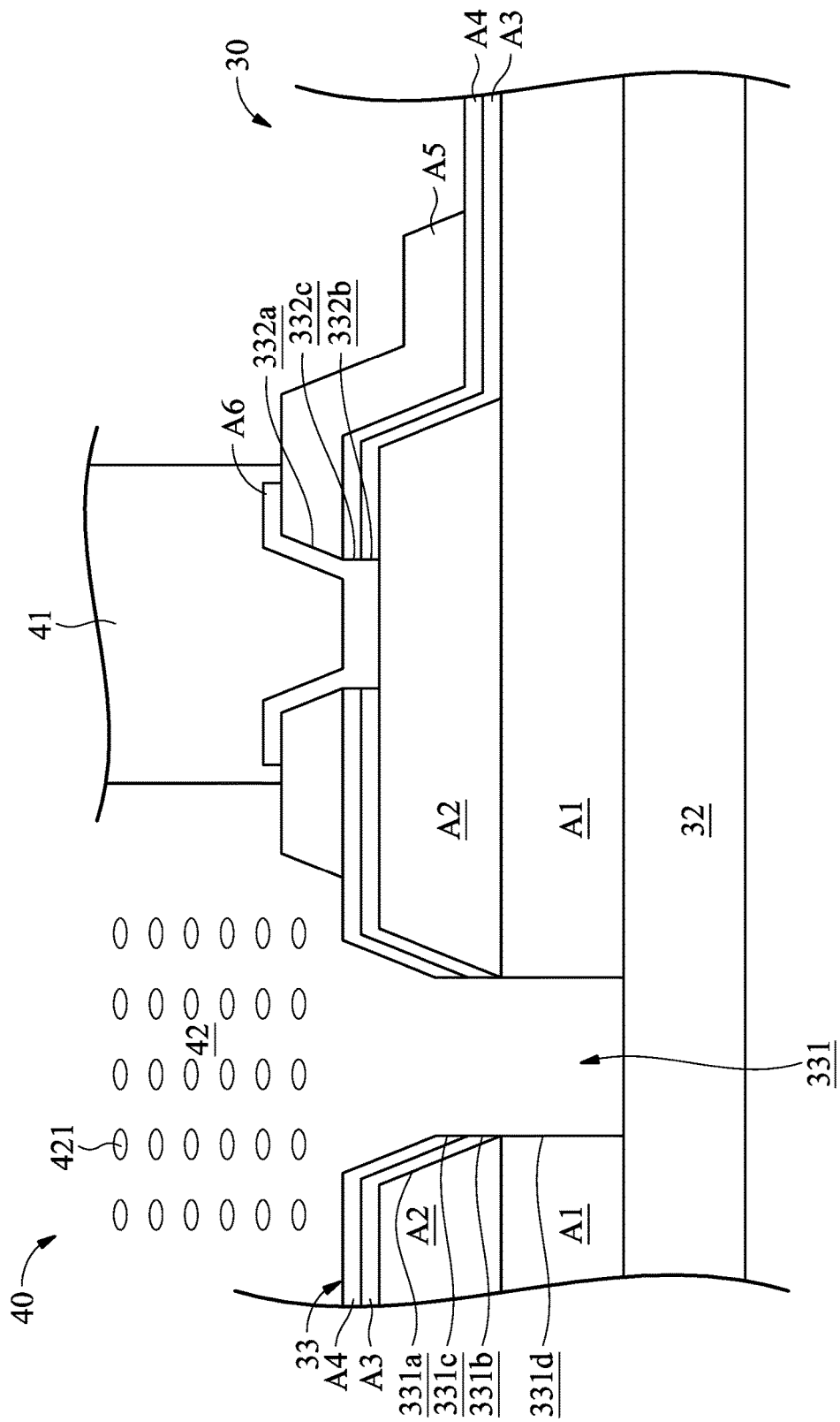
FIG. 2 is a schematic view of a radiator in accordance with the first embodiment of the disclosure.

FIG. 2 is a schematic view of the radiator 30 in accordance with a first embodiment of the disclosure. The radiation-signal layer 33 includes a buffer layer A1, a metal layer A2, an insulation layer A3, an etch-stop layer A4, a protective layer A5, and a conductive layer A6.

The buffer layer A1 is disposed on the substrate 32, and extends parallel to the substrate 32. The buffer layer A1 is configured to decrease the stress between the metal layer A2 and the substrate 32. Moreover, the buffer layer A1 could be configured to enhance the adhesion between the metal layer A2 and the substrate 32, and thus the metal layer A2 can be greatly attached on the substrate 32. Moreover, the radiation-signal layer 33 has an opening area 331, and the microwave signals can enter into the modulation structure 40 via the opening area 331. It should be noted that, when the thickness of the metal layer A2 is decreased, or when the metal layer A2 with appropriate materials may not seriously bend the substrate 32, the buffer layer A1 can be omitted.

The buffer layer A1 may include insulation materials, but it is not limited thereto. In some embodiments, the buffer layer A1 includes aluminum oxide, silicon nitride (SiNx), silicon oxide, silicon oxynitride, other suitable materials for buffer layer, or a combination thereof, but it is not limited thereto. The thickness of the buffer layer A1 is in a range from about 1000 Å (Angstrom) to 20000 Å. In this embodiment, the thickness of the buffer layer A1 is about 8000 Å. The buffer layer A1 has an opening area 331d corresponding to the opening area 331.

The metal layer A2 is disposed on the buffer layer A1, and extends parallel to the substrate 32. The metal layer A2 is configured to transmit the microwave signals. Moreover, the metal layer has an opening area 331a corresponding to the opening area 331. Therefore, the microwave signals can enters into the modulation structure 40 via the opening area 331 (including the opening areas 331a and 331d).

The material of the metal layer A2 may be low-resistance materials, such as copper, aluminum, silver, gold, alloys, other suitable materials for metal layer, or a combination thereof, but it is not limited thereto. The thickness of the metal layer A2 is in a range from about 2 um to 5 um. In this embodiment, the thickness of the metal layer A2 is about 3 um. The thickness of the metal layer A2 may be thicker than 2 times to 10 times the thickness of the buffer layer A1.

The insulation layer A3 is disposed on the metal layer A2. In other words, a portion of the insulation layer A3 is disposed between the protective layer A5 and the metal layer A2. The insulation layer A3 extends along the surface of the metal layer A2 and the buffer layer A1. The insulation layer A3 may be in contact with or cover over 50% of the area of the metal layer A2. Moreover, the insulation layer A3 may be in contact with or cover the area of the buffer layer A1 not covered by the metal layer A2.

The insulation layer A3 is configured to protect the metal layer A2. In this embodiment, the insulation layer A3 is configured to reduce or prevent oxidation or corrosion at the metal layer A2 outside the sealing wall 41. The insulation layer A3 has an opening area 331b corresponding to the opening area 331. Therefore, the microwave signals can enter into the modulation structure 40 via the opening area 331 (including opening areas 331b and 331d).

The materials of the insulation layer A3 may be silicon nitride, silicon oxide, silicon oxynitride, aluminum oxide, or a combination thereof, but it is not limited thereto. The thickness of the insulation layer A3 is in a range from about 300 Å to 1500 Å. In this embodiment, the thickness of the insulation layer A3 is about 500 Å. The thickness of the metal layer A2 may be thicker than 3 times to 30 times the thickness of the insulation layer A3.

The etch-stop layer (ESL) A4 is disposed on the insulation layer A3. In other words, the etch-stop layer A4 is disposed between the protective layer A5 and the metal layer A2. The etch-stop layer A4 may extend along the surface of the insulation layer A3. The etch-stop layer A4 may be in contact with or cover over 90% of the area of the insulation layer A3. The etch-stop layer A4 includes an opening area 331c corresponding to the opening area 331. Therefore, the microwave signals may enter into the modulation structure 40 via the opening area 331 (including the opening areas 331c and 331d).

In some embodiments, the material of the etch-stop layer A4 may be silicon oxide (such as $SiO_2$), other suitable materials, or a combination thereof, but it is not limited thereto. In some embodiments, the etch-stop layer A4 includes transparent oxide materials. The thickness of the etch-stop layer A4 is in a range from about 300 Å to 1500 Å. In this embodiment, the thickness of the etch-stop layer A4 is about 500 Å. The thickness of the etch-stop layer A4 may be the same or substantially the same as the thickness of the insulation layer A3.

The term "etch-stop" of the etch-stop layer A4 of the disclosure does not indicate that the etch-stop layer A4 can resist or block any kind of etching process, but indicates that the materials of the etch-stop layer A4 has a lower etching rate to a specific etching process. For example, in some embodiments, the materials of the buffer layer A1, the insulation layer A3 and the protective layer A5 are the same. The materials of the etch-stop layer A4 is different from the materials of the buffer layer A1, the insulation layer A3 and the protective layer A5. When an etching process performs on the protective layer A5, and the etching rate of the etch-stop layer A4 to the etching process is lower, the etch-stop layer A4 will not be removed completely by the etching process. Therefore, the object of protecting the insulation layer A3 is achieved, and the metal layer A2 is prevented from oxidation.

The protective layer A5 is disposed on the etch-stop layer A4. The protective layer A5 extends along the surface of the etch-stop layer A4, and covers a portion of the etch-stop layer A4. In this embodiment, the protective layer A5 is disposed on a portion of the metal layer A2. A portion of the protective layer A5 is disposed on the buffer layer A1, and is not located over the metal layer A2.

In this embodiment, the metal layer A2 does not cover a portion of the buffer layer A1. In an area outside of the sealing wall 41, a portion of the protective layer A5 is disposed on the buffer layer A1. In other words, in an area outside of the sealing wall 41, the metal layer A2 is not disposed between a portion of the protective layer A5 and the buffer layer A1.

The protective layer A5 can include insulation materials, but it is not limited thereto. In some embodiments, the materials of the protective layer A5 may be silicon nitride, glass, organic materials, other suitable materials for the protective layer, or a combination thereof. The organic materials include Polyethylene Terephthalate (PET), Polyethylene (PE), Polyethersulfone (PES), Polycarbonate (PC), or Polymethylmethacrylate (PMMA), but it is not limited thereto.

The thickness of the protective layer A5 is in a range of about 2000 Å to 5000 Å. In this embodiment, the thickness of the protective layer A5 is about 2900 Å. The thickness of the metal layer A2 may be thicker than 4 times to 25 times the thickness of the protective layer A5. The thickness of the protective layer A5 may be thicker than 3 times to 15 times the thickness of the insulation layer A3.

The protective layer A5 is configured to protect the metal layer A2. In this embodiment, the protective layer A5 is configured to reduce or prevent oxidation at the metal layer A2 outside the sealing wall 41. Since the thickness of the protective layer A5 is thicker than the thickness of the insulation layer A3, the protective layer A5 provides greater protection to the metal layer A2.

Since the portion of the radiator 30 outside the sealing wall 41 may be exposed in the air, the protective layer A5 with thicker thickness can greatly provide protection on the metal layer A2 outside the metal layer A2, and thus the durability of the microwave modulation device 1 is improved.

In this embodiment, the protective layer A5 includes a through hole 332a, and the through hole 332a is overlaid on a portion of the metal layer A2, in another word, the through hole 332a overlaps with a portion of the metal layer A2. It should be noted that the through hole 332a is overlaid on a portion of the metal layer A2 in a direction perpendicular to the second surface 323, and the contour of the through hole 332a overlaps with a portion of the metal layer A2. The insulation layer A3 and the etch-stop layer A4 includes through holes 332b and 332c corresponding to the through hole 332a, and exposing a portion of the metal layer A2.

The conductive layer A6 is disposed on the protective layer A5, and a portion of the conductive layer A6 is located in the through hole 332a. The conductive layer A6 may be connected to or in direct contact with the upper surface of the metal layer A2 via the through holes 332a, 332b and 332c. Moreover, the conductive layer A6 may be connected to or in direct contact with a side wall of the insulation layer A3 in the through hole 332b, be connected to or in direct contact with a side wall of the etch-stop layer A4 in the through hole 332c, and be connected to or in direct contact with a side wall of the protective layer A5 in the through hole 332a. A portion of the conductive layer A6 is disposed on the protective layer A5 and the etch-stop layer A4. In this embodiment, a portion of the etch-stop layer A4 is located between the conductive layer A6 and the metal layer A2.

The conductive layer A6 may include transparent conductive materials. In some embodiments, the materials of the conductive layer A6 may be Indium Tin Oxide (ITO), Indium Zinc Oxide (IZO), other suitable materials for conductive layer, or a combination thereof, but it is not limited thereto. The thickness of the conductive layer A6 is in a range of about 300 Å to 700 Å. In this embodiment, the thickness of the etch-stop layer A4 is about 500 Å. The thickness of the conductive layer A6 could be the same or substantially the same as the thickness of the insulation layer A3 or the etch-stop layer A4.

In some embodiments, the sealing wall 41 includes conductive materials. The conductive layer A6 is configured to connect the sealing wall 41 and the metal layer A2. In other words, the sealing wall 41 could be electrically connected to the metal layer A2 via the conductive layer A6. In some embodiments, the sealing wall 41 is grounding. In this embodiment, the sealing wall 41 is disposed on the protective layer A5, and corresponds to through holes 332a, 332b and 332c.

The disclosure provides various manufacturing methods of the radiator 30 of the microwave modulation device 1. FIGS. 3A to 3D are schematic views of the radiators 30 during manufacturing intermediate stages in accordance with the first embodiment of the disclosure.

Figure 3A:
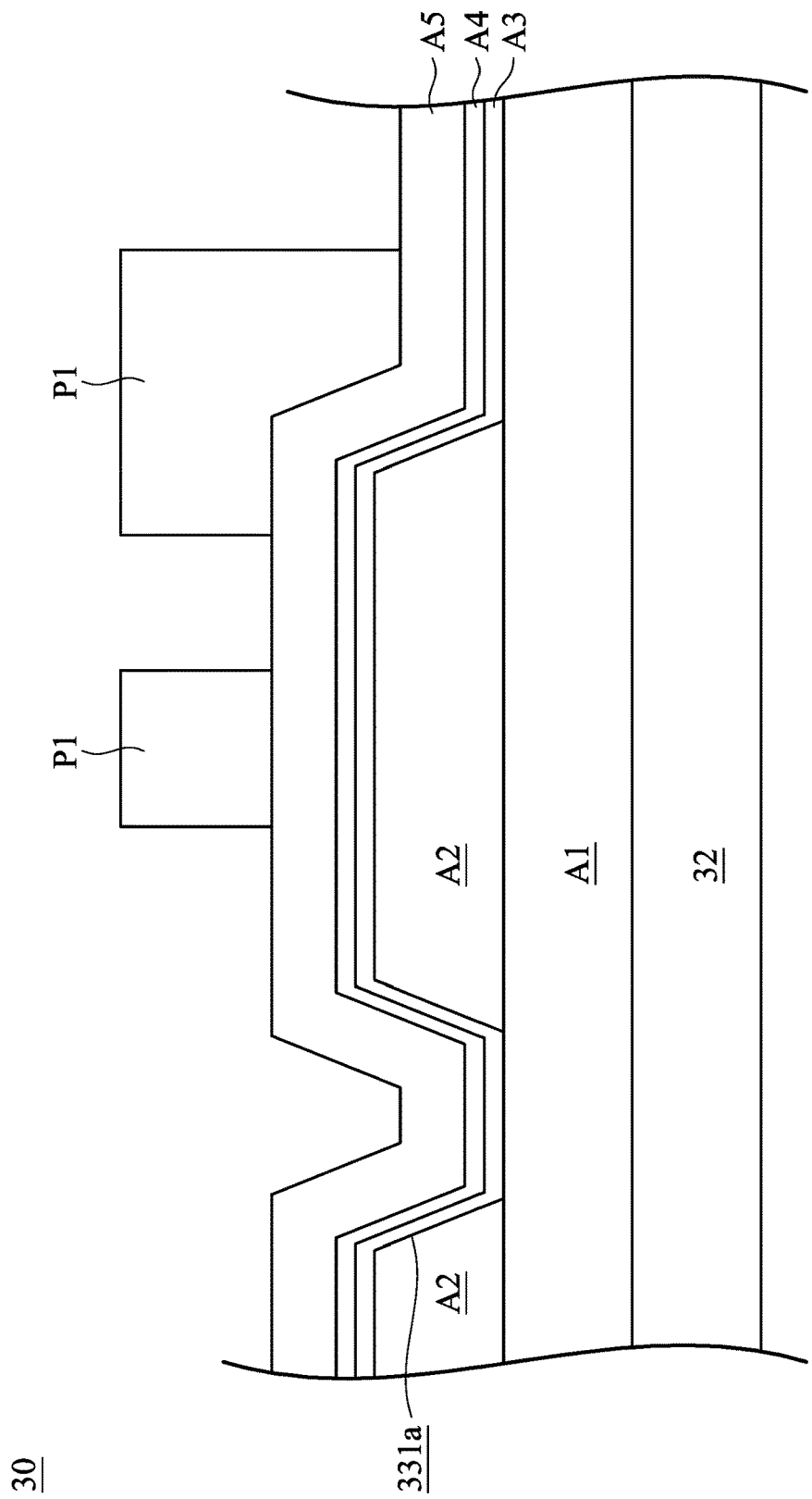
FIGS. 3A to 3D are schematic views of the radiators during manufacturing intermediate stages in accordance with the first embodiment of the disclosure.

As shown in FIG. 3A, the buffer layer A1, the patterned metal layer A2, the insulation layer A3, the etch-stop layer A4, and the protective layer A5 are formed on the substrate 32 in sequence. Moreover, a patterned photoresist P1 is formed on the protective layer A5.

Figure 3B:
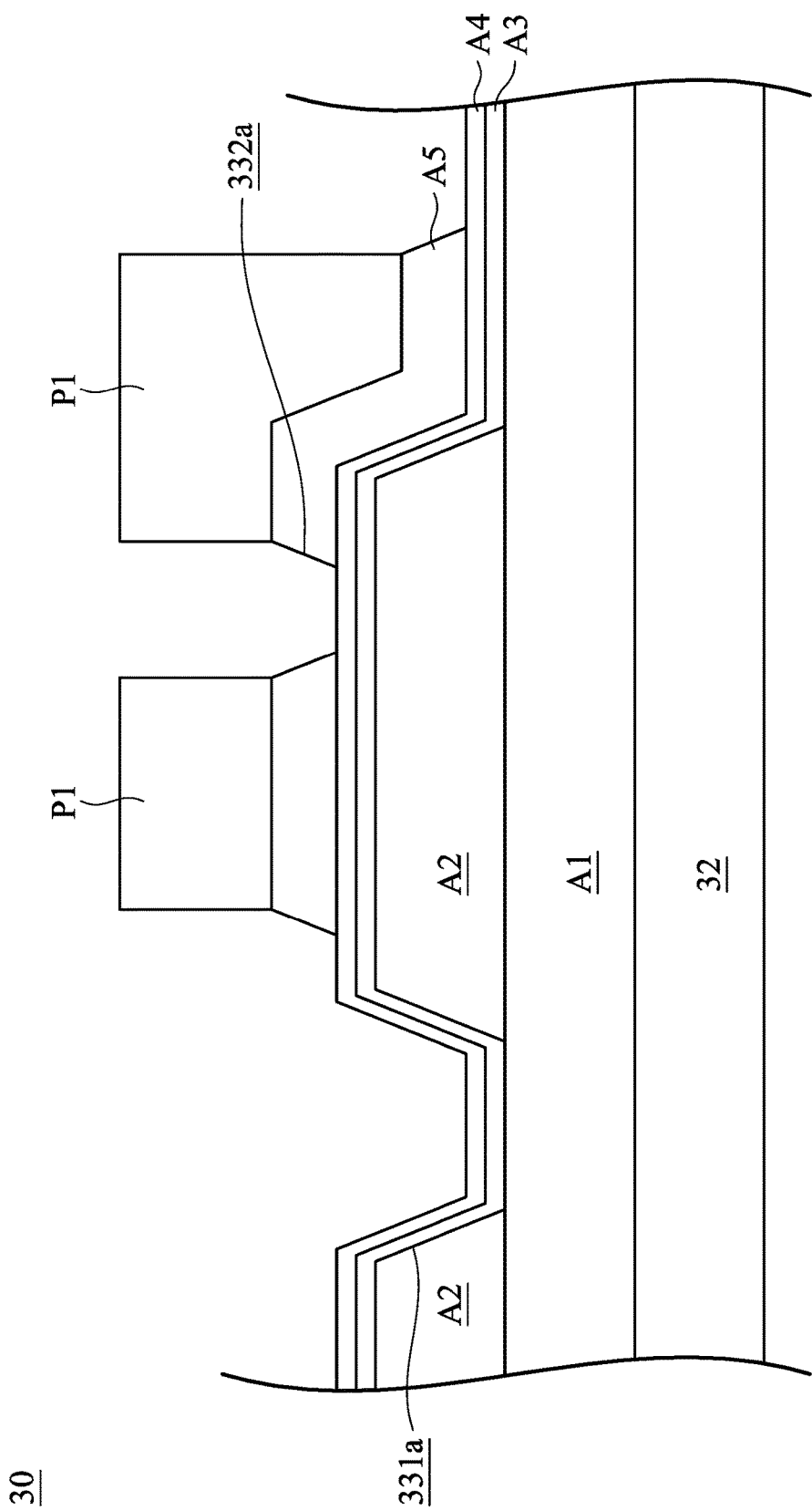

As shown in FIG. 3B, a portion of the protective layer A5 uncovered by the photoresist P1 is removed by a first etching process. Afterwards, the photoresist P1 is removed. In this embodiment, the first etching process can used to remove the portion of protective layer A5.

During the first etching process, the etch-stop layer A4 is not etched or completely removed by the etching process. In other words, during the first etching process, the etching rate of the etch-stop layer A4 is lower than etching rate of the protective layer A5. Therefore, in this embodiment, the etch-stop layer A4 is configured to protect the insulation layer A3 during the first etching process.

Figure 3C:
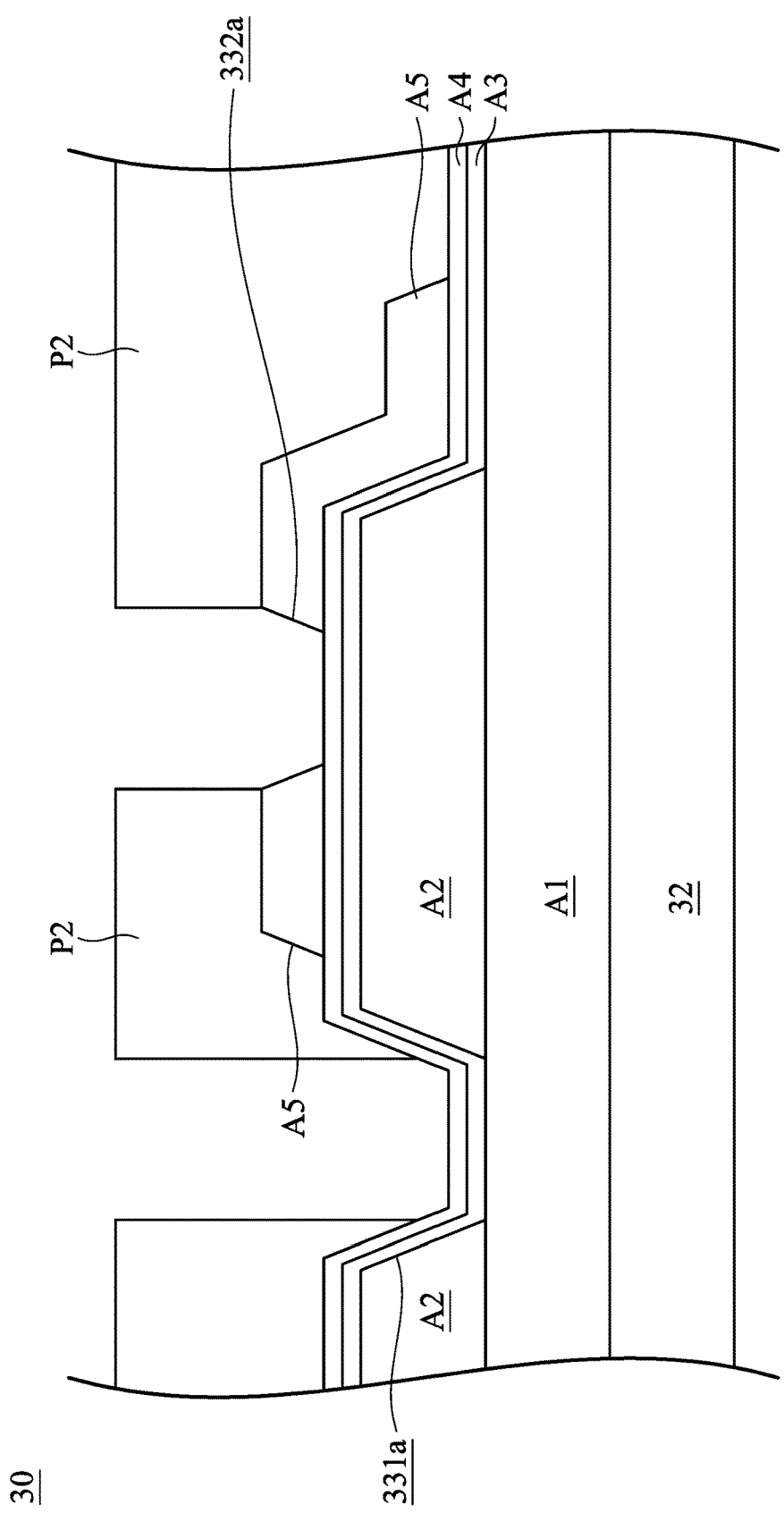
Figure 3D:
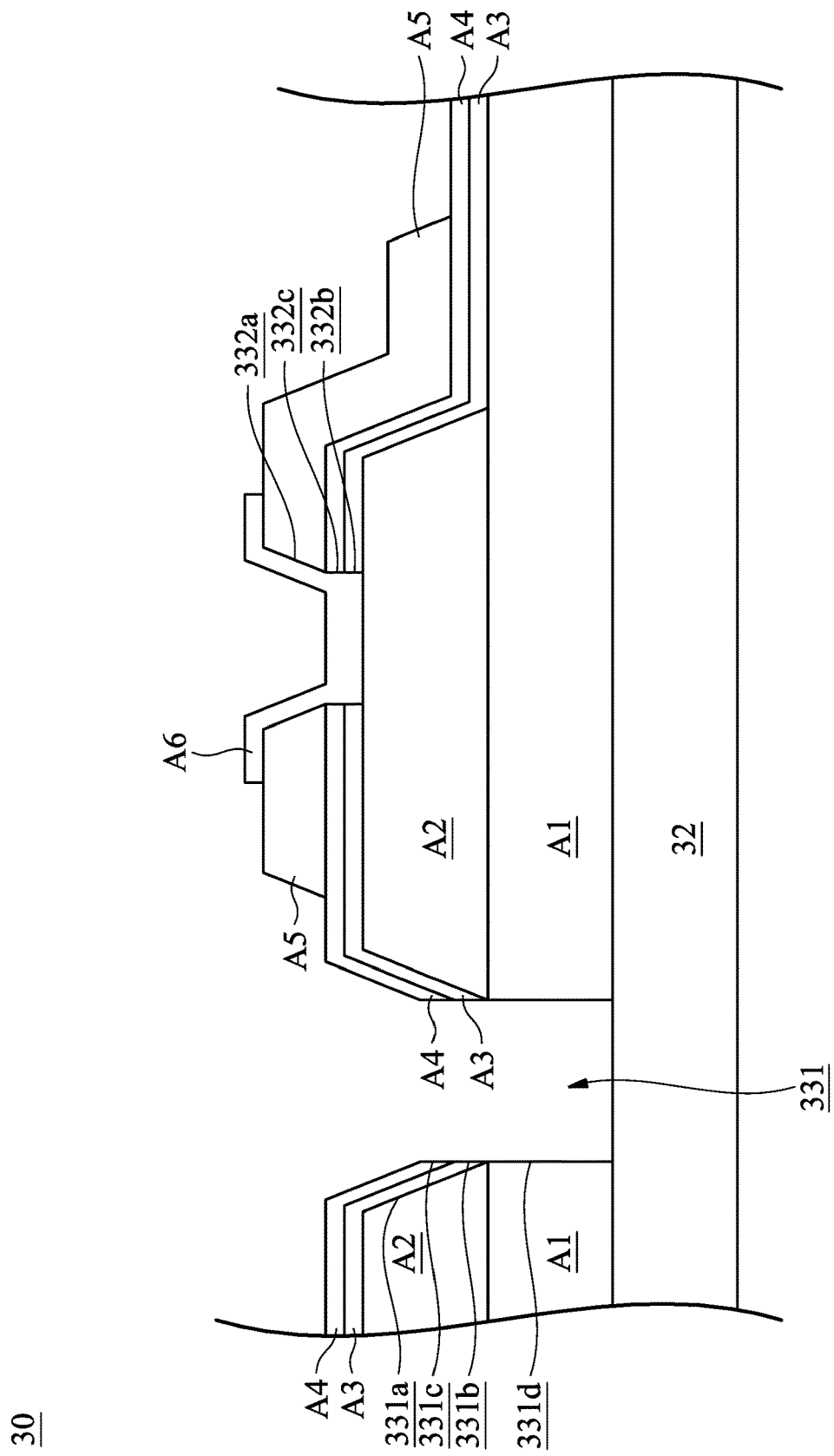

As shown in FIG. 3C, a patterned photoresist P2 is formed on the etch-stop layer A4 and the protective layer A5. Afterwards, a second etching process removes portions of the etch-stop layer A4, the insulation layer A3 and the buffer layer A1, which are not covered by the photoresist P2. As shown in FIG. 3D, as a result, the opening area 331 and the through holes 332a, 332b and 332c are formed. And then, as shown in FIG. 3D, the conductive layer A6 is formed on the protective layer A5, and a portion of the conductive layer A6 extends into the through holes 332a, 332b and 332c.

In this embodiment, the second etching process is configured to remove the portions of the etch-stop layer A4, the insulation layer A3 and the buffer layer A1. During the second etching process, the metal layer A2 and the substrate 32 may not be etched or completely removed by the etching process. In other words, during the second etching process, the etching rate of the metal layer A2 and the substrate 32 is lower than the etching rate of the buffer layer A1, the insulation layer A3 and the etch-stop layer A4.

Figure 4:
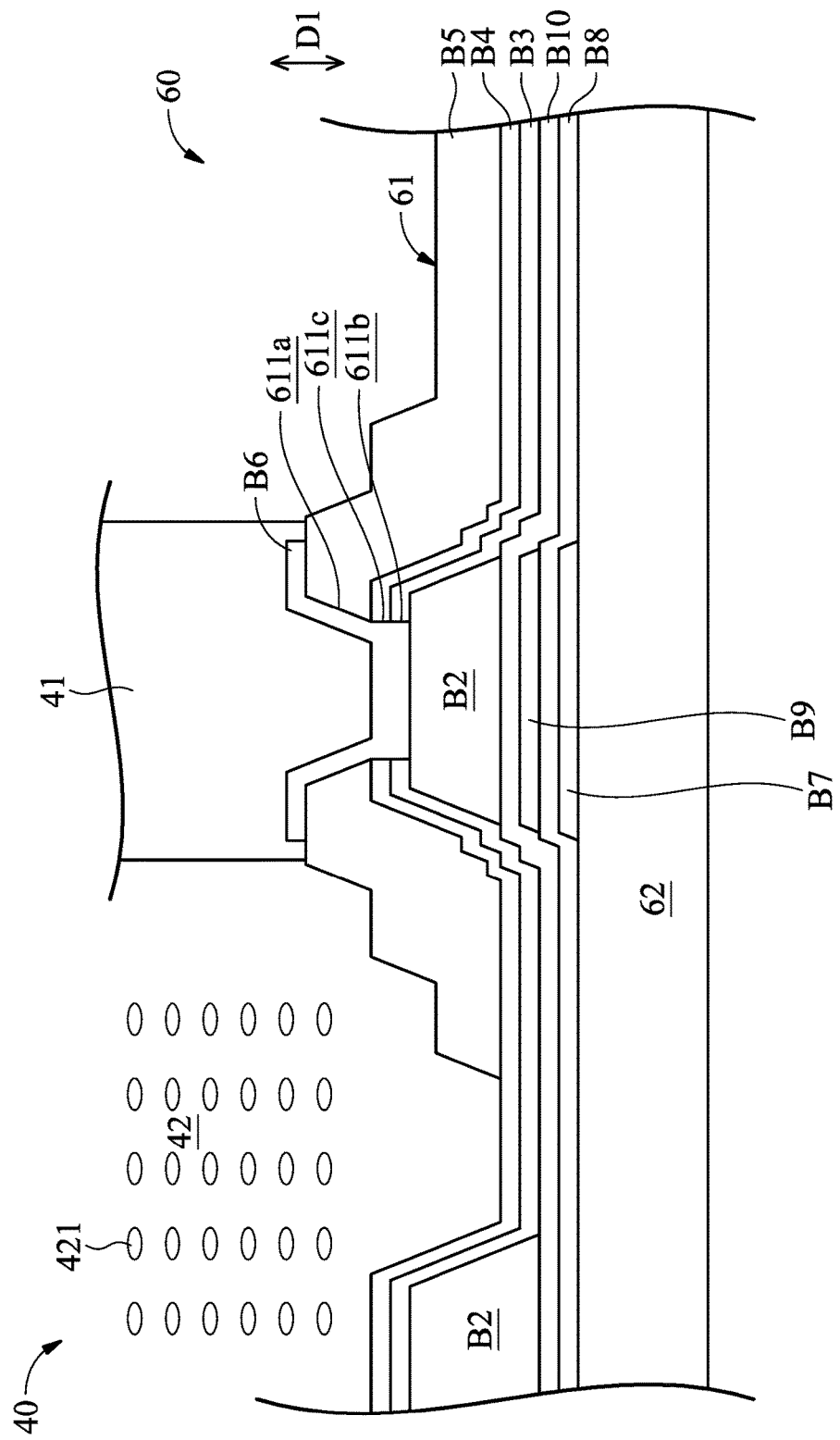
FIG. 4 is a schematic view of a radiator in accordance with some embodiments of the disclosure.

FIG. 4 is a schematic view of a radiator 60 in accordance with some embodiments of the disclosure. In the disclosure, the illustrations of the structure and the manufacturing method of a radiation-signal layer 61 can refer to the description of the radiation-signal layer 33. The main difference between the radiator 60 and the radiator 30 is that many electrode layers and insulation layers are formed between a metal layer B2 and a substrate 62.

In this embodiment, a patterned first electrode layer B7, an insulation layer B8, a patterned second electrode layer B9, and an insulation layer B10 are formed on the substrate 62 along the stacking direction D1 in sequence. In some embodiments, thin film transistor can be formed by portions of the first electrode layer B7, the insulation layer B8, the second electrode layer B9, and the insulation layer B10.

The radiator 60 may not include a buffer layer and an opening area. Moreover, in this embodiment, the metal layer B2 is disposed on the insulation layer B10. An insulation layer B3 is disposed on the metal layer B2 and a portion of the insulation layer B10 not covered by the metal layer B2. An etch-stop layer B4 is disposed on the insulation layer B3. A protective layer B5 is disposed on the etch-stop layer B4. A conductive layer B6 is disposed on the protective layer B5, and a portion of the conductive layer B6 extends to a through hole 611a of the protective layer B5, a through hole 611c of the etch-stop layer B4, and a through hole 611b of the insulation layer B3, and is connected to or in direct contact with the metal layer B2.

Since a portion of the radiator 60 outside the sealing wall 41 may be exposed in air, the protective layer B5 with thicker thickness can greatly protect the metal layer B2 outside the sealing wall 41, and thus the durability of the microwave modulation device 1 is improved.

It should be noted that although most of the embodiments of the disclosure is exemplified by the radiator 30, the arrangement positions and the manufacturing processes of the insulation layer A3, the etch-stop layer A4, the protective layer A5 and the conductive layer A6 (corresponding to the insulation layer B3, the etch-stop layer B4, the protective layer B5 and the conductive layer B6) may be implemented on the radiator 60. In addition, the disclosure is not limited to the radiator 60 and the radiator 30 in the above-mentioned layers must be applied with the same arrangement positions and the manufacturing processes of this embodiment. One having ordinary skilled in the art can respectively choose from the embodiments disclosed on this disclosure to fit the arrangement positions and the manufacturing processes of the radiator 60 and the radiator 30 according to their design requirements.

Figure 5:
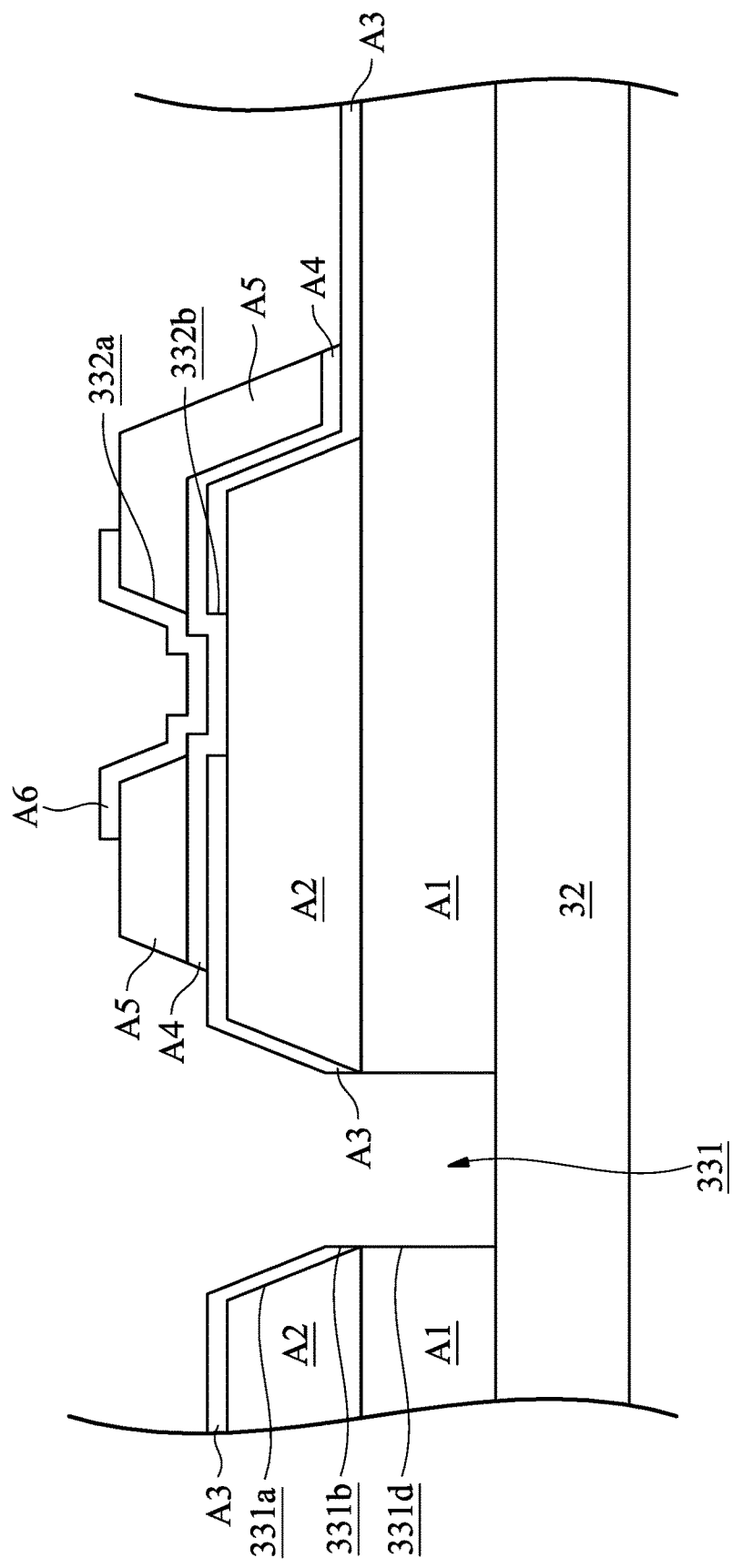
FIG. 5 is a schematic view of a radiator in accordance with a second embodiment of the disclosure.

FIG. 5 is a schematic view of a radiator 30 in accordance with a second embodiment of the disclosure. In this embodiment, the etch-stop layer A4 and the protective layer A5 is not disposed on a portion of the insulation layer A3. A portion of the etch-stop layer A4 is located in the through hole 332b, and a portion of the conductive layer A6 is in contact with the etch-stop layer A4.

In this embodiment, the etch-stop layer A4 includes at least one conductive material. In some embodiments, the etch-stop layer A4 may include at least one transparent material. The material of the etch-stop layer A4 may be Indium Zinc Oxide (IZO) or Indium Tin Oxide (ITO), but it is not limited thereto.

Figure 6A:
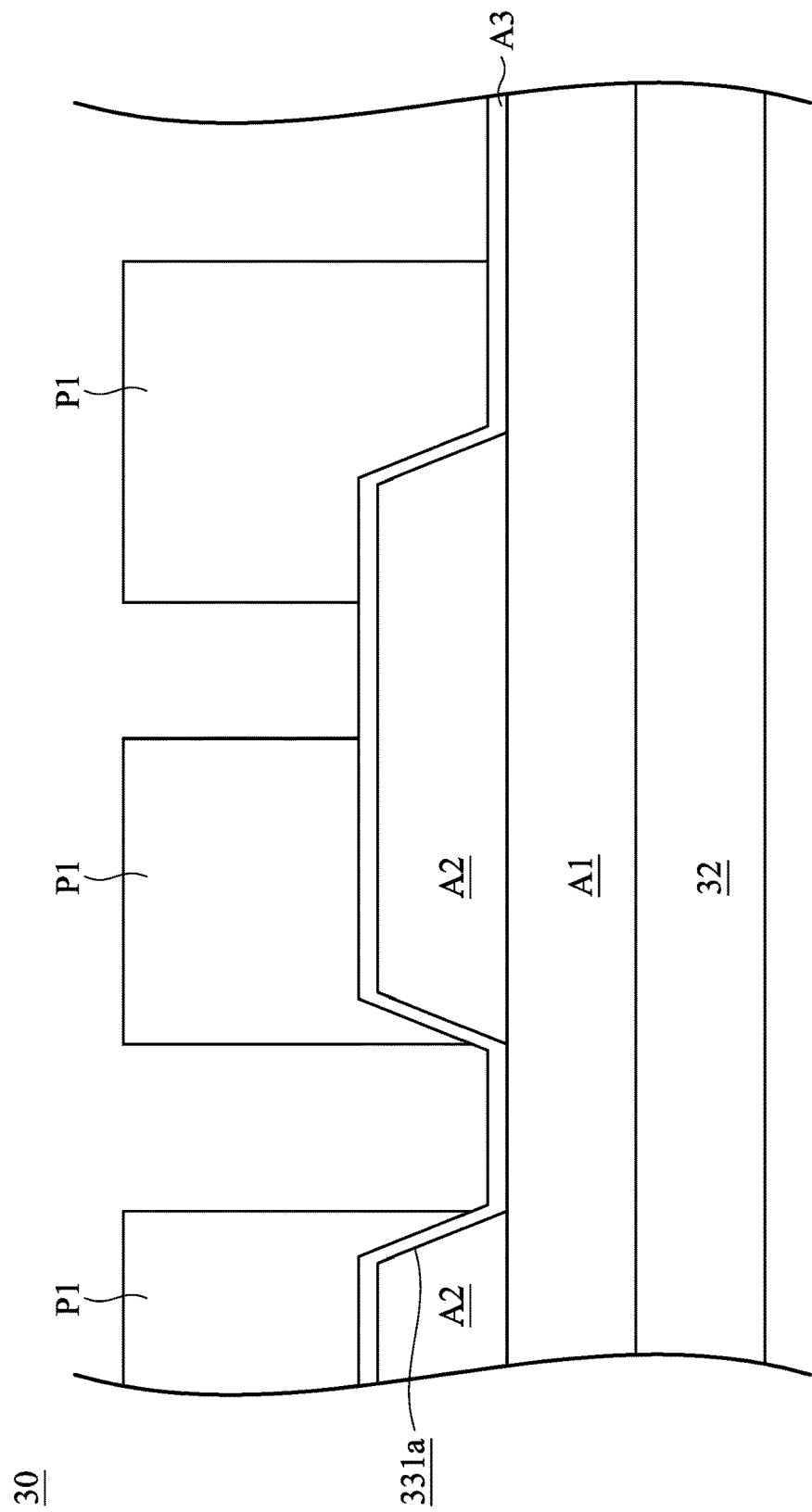
FIGS. 6A to 6D are schematic views of the radiators during manufacturing intermediate stages in accordance with the second embodiment of the disclosure.
Figure 6B:
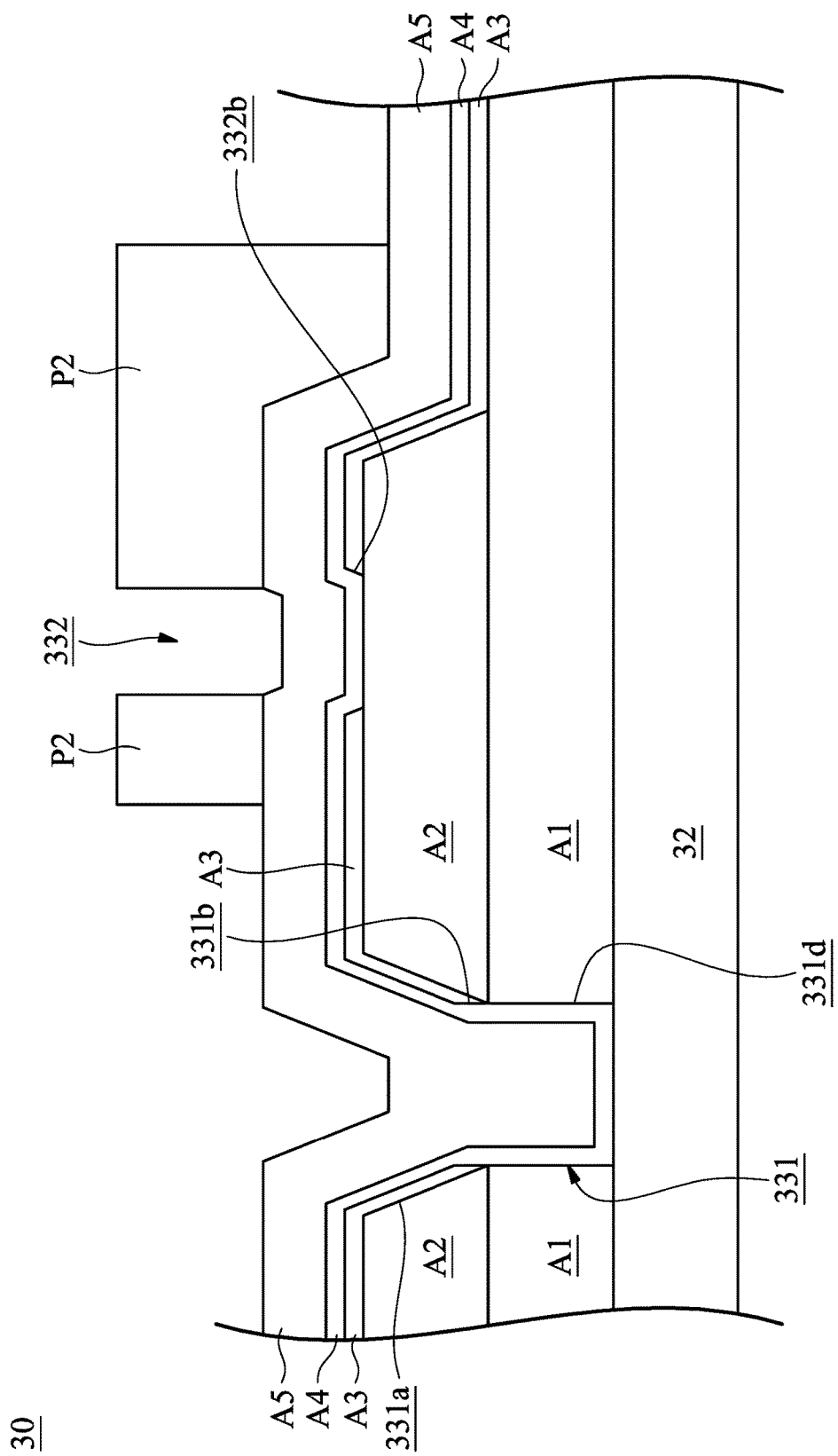

FIGS. 6A to 6D are schematic views of the radiators 30 during manufacturing intermediate stages in accordance with the second embodiment of the disclosure. As shown in FIG. 6A, the buffer layer A1, the patterned metal layer A2, and the insulation layer A3 are formed on the substrate 32 in sequence. Moreover, a patterned photoresist P1 is formed on the insulation layer A3. Afterwards, portions of the buffer layer A1 and the insulation layer A3 uncovered by the photoresist P1 are removed by the first etching process, so as to form the opening areas 331b, and 331d and the through hole 332b (as shown in FIG. 6B). Afterwards, the photoresist P1 is removed.

Figure 6C:
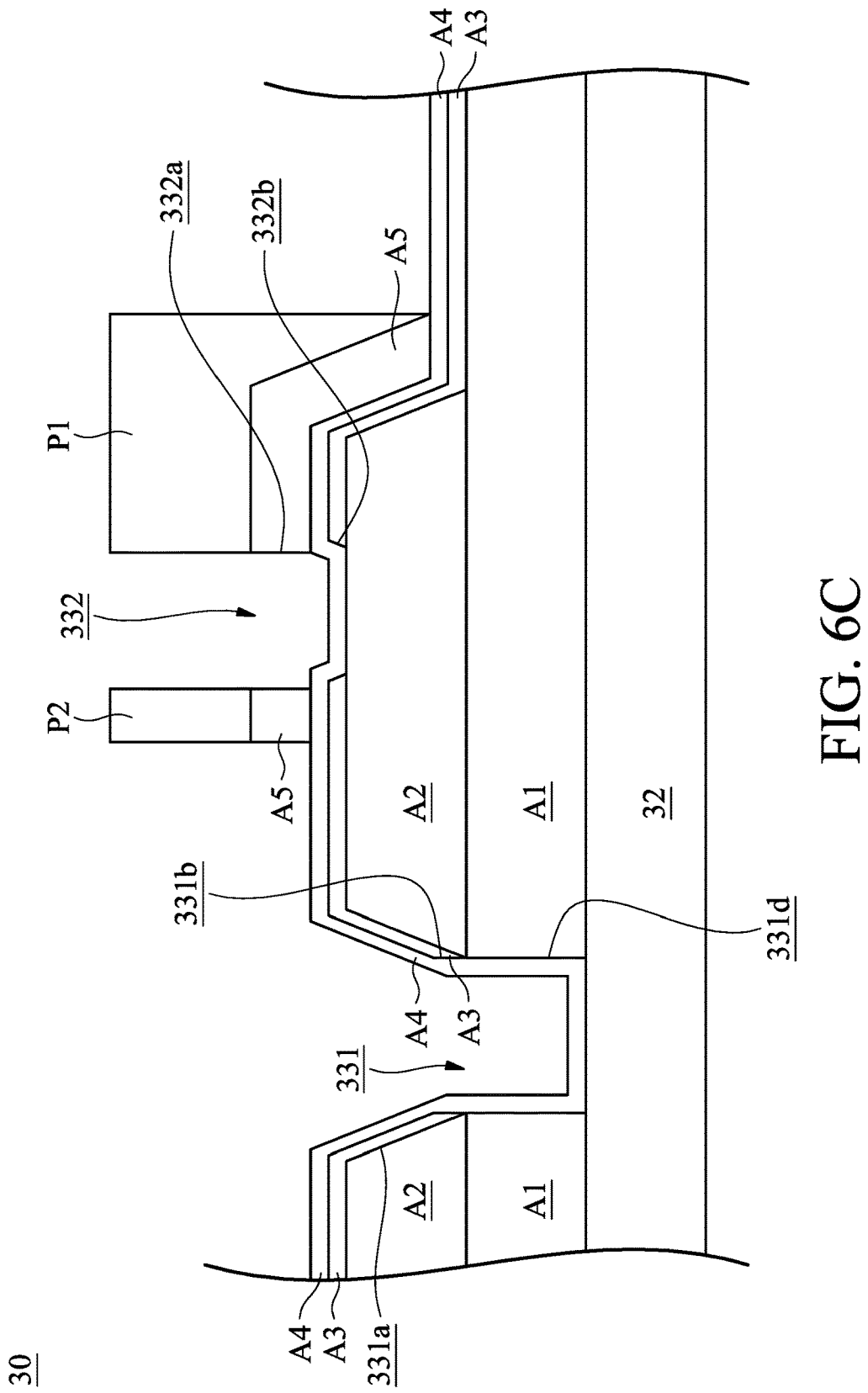

As shown in FIG. 6B, the etch-stop layer A4 and the protective layer A5 are formed on the insulation layer A3 in sequence. Moreover, a patterned photoresist P2 is formed on the protective layer A5. Afterwards, a portion of the protective layer A5 uncovered by the photoresist P2 is removed by the second etching process (as shown in FIG. 6C). Afterwards, the photoresist P2 is removed.

Figure 6D:
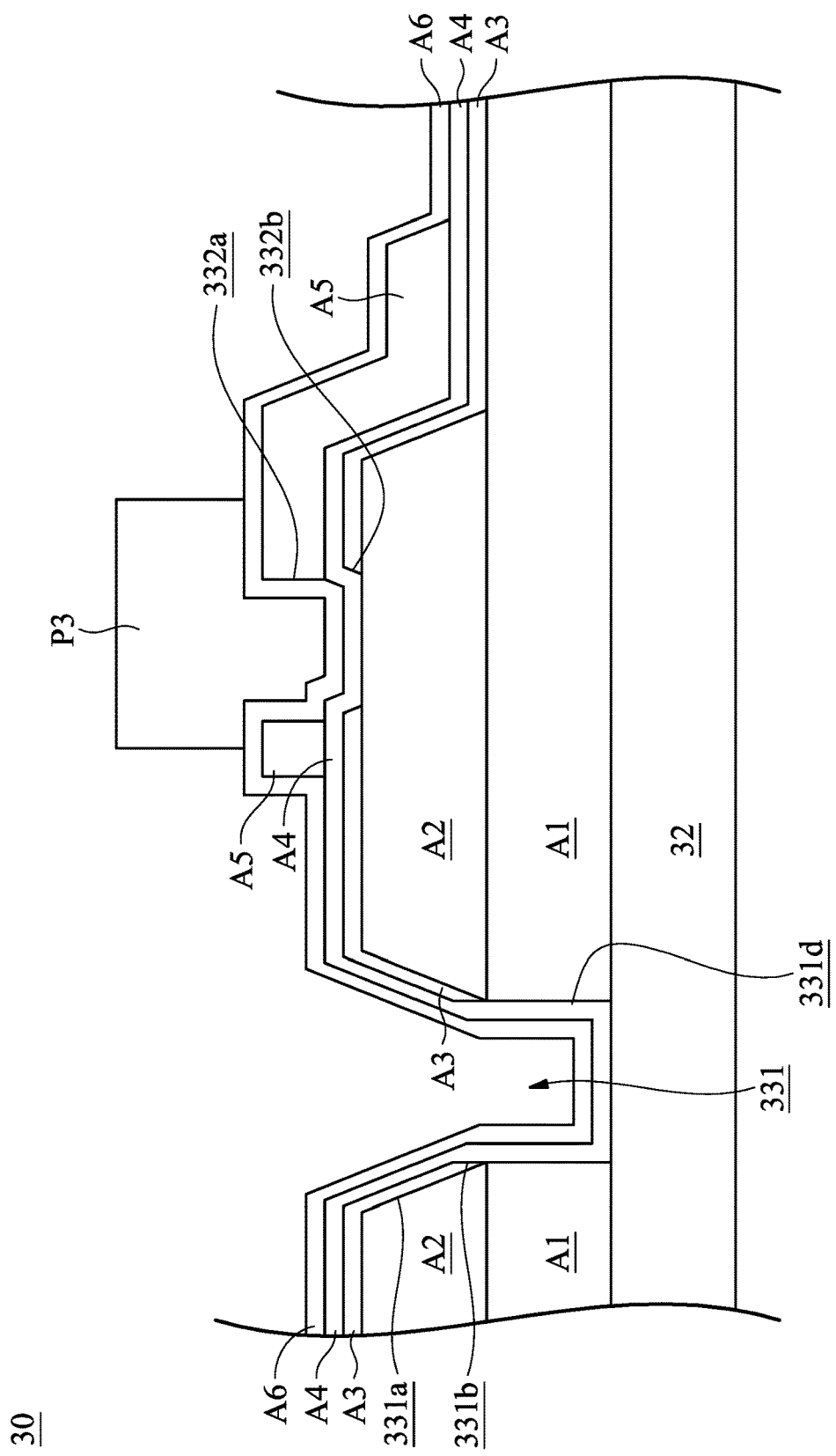

As shown in FIG. 6D, the conductive layer A6 is formed on the etch-stop layer A4 and the protective layer A5. Moreover, a part of the conductive layer A6 may extend into the opening area 331 and the through hole 332a. Next, a patterned photoresist P3 is formed on the conductive layer A6.

Afterwards, a portion of the conductive layer A6 uncovered by the photoresist P3 is removed by the third etching process. In this embodiment, the materials of the conductive layer A6 and the etch-stop layer A4 have similar etching selectivity, such as metal oxide materials (such as Indium Tin Oxide and Indium Zinc Oxide). Therefore, during removal of the portion of the conductive layer A6 uncovered by the photoresist P3, a portion of the etch-stop layer A4 corresponding to the portion of the conductive layer A6 is also removed. Afterwards, the photoresist P3 is removed, so as to form the radiation-signal layer 33 as shown in FIG. 5.

Figure 7:
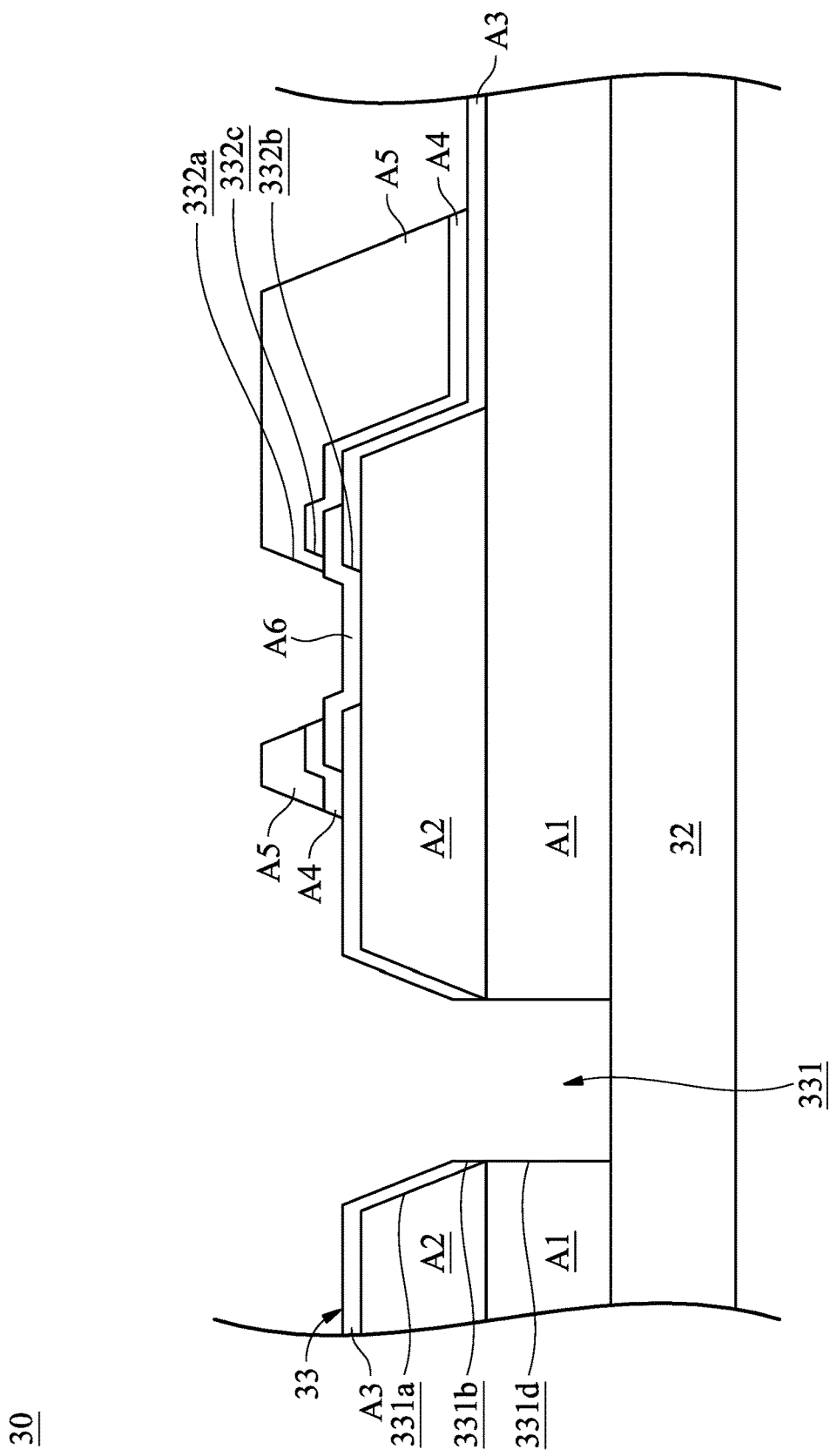
FIG. 7 is a schematic view of the radiator in accordance with the third embodiment of the disclosure.

FIG. 7 is a schematic view of the radiator 30 in accordance with the third embodiment of the disclosure. In this embodiment, a portion of the conductive layer A6 is disposed between the etch-stop layer A4 and the metal layer A2. A portion of the conductive layer A6 is located between the protective layer A5 and the metal layer A2. In this embodiment, the etch-stop layer A4 covers a portion of the insulation layer A3.

In this embodiment, the etch-stop layer A4 includes at least one conductive material. In some embodiments, the conductive material includes transparent oxide materials. Moreover, the material of the etch-stop layer A4 may be Indium Zinc Oxide (IZO) or Indium Tin Oxide (ITO), but it is not limited thereto. Moreover, a portion of the conductive layer A6 extends into the through hole 322b and is in direct contact with the metal layer A2.

Figure 8:
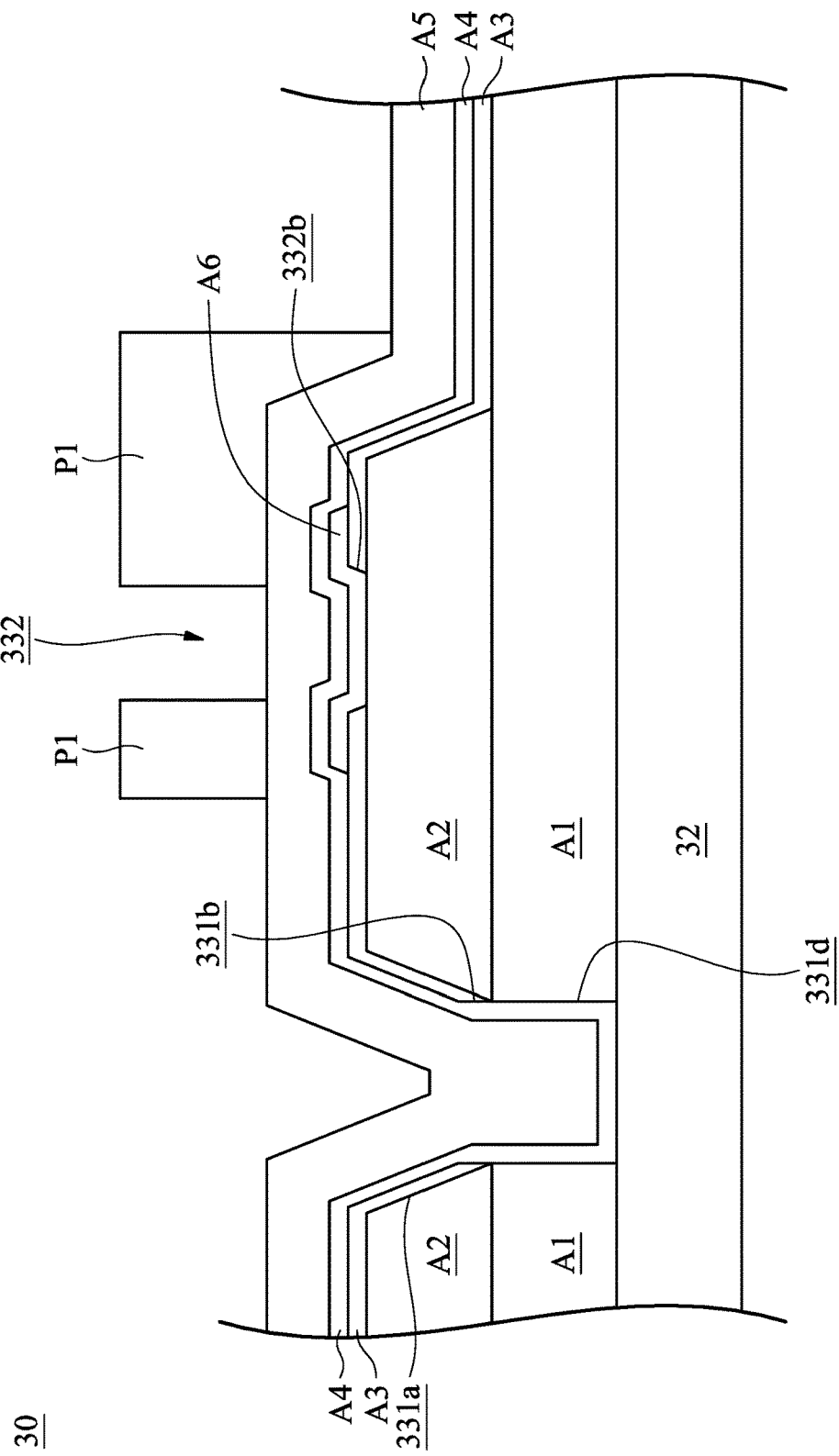
FIG. 8 is a schematic view of the radiator during manufacturing intermediate stage in accordance with the third embodiment of the disclosure.

FIG. 8 is a schematic view of the radiator 30 during manufacturing intermediate stage in accordance with the third embodiment of the disclosure. Please refer to the manufacturing method of the described embodiment. As shown in FIG. 8, the buffer layer A1, the patterned metal layer A2, and the insulation layer A3 are formed on the substrate 32 in sequence. The opening area 331d and 331b and the through hole 332b are formed on the buffer layer A1 and the insulation layer A3. Afterwards, the conductive layer A6 is formed on the metal layer A2 and the insulation layer A3. A portion of the conductive layer A6 extends into the through hole 332b, and is in contact with the metal layer A2 in the through hole 332b. Next, the first etching process is formed on the conductive layer A6, and a portion of the conductive layer A6 is removed.

Afterwards, the etch-stop layer A4 and the protective layer A5 are formed on the insulation layer A3 and the conductive layer A6 in sequence. Next, the photoresist P1 is formed on the protective layer A5.

A portion of the protective layer A5 uncovered by the photoresist P1 is removed by the second etching process. Next, a portion of the etch-stop layer A4 uncovered by the photoresist P1 is removed. Afterwards, the photoresist P1 is removed, so as to form the radiation-signal layer 33 as shown in FIG. 7.

Figure 9:
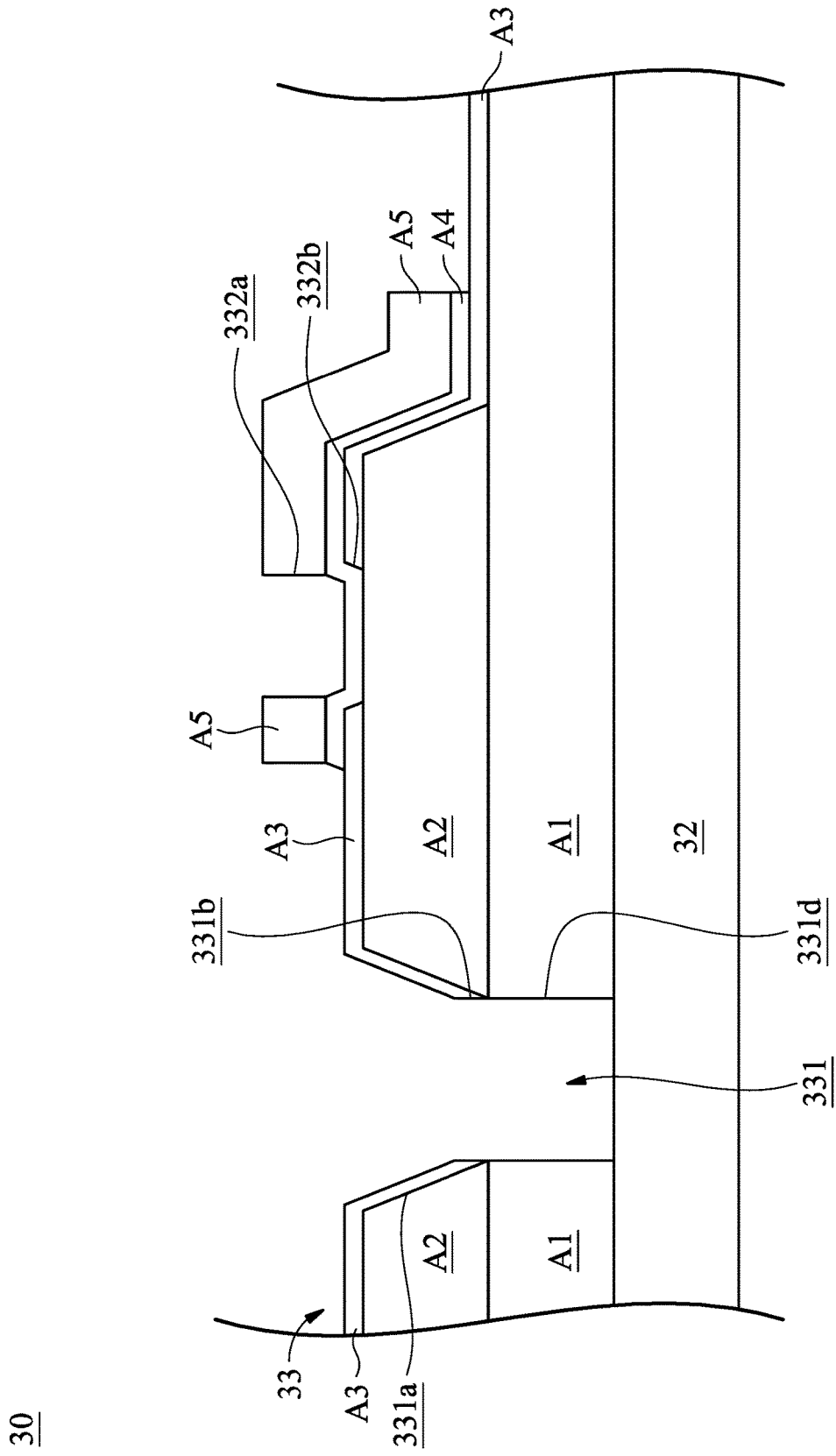
FIG. 9 is a schematic view of the radiator in accordance with the fourth embodiment of the disclosure.

FIG. 9 is a schematic view of the radiator 30 in accordance with the fourth embodiment of the disclosure. In this embodiment, the etch-stop layer A4 includes conductive materials. In some embodiments, the etch-stop layer A4 may include at least one transparent material. Moreover, the materials of the etch-stop layer A4 may be Indium Zinc Oxide (IZO) or Indium Tin Oxide (ITO), but it is not limited thereto.

In this embodiment, the etch-stop layer A4 further has the function as conductive layer. Therefore, the radiation-signal layer 33 may not include the conductive layer A6. In this embodiment, the etch-stop layer A4 covers a portion of the insulation layer A3.

Figure 10A:
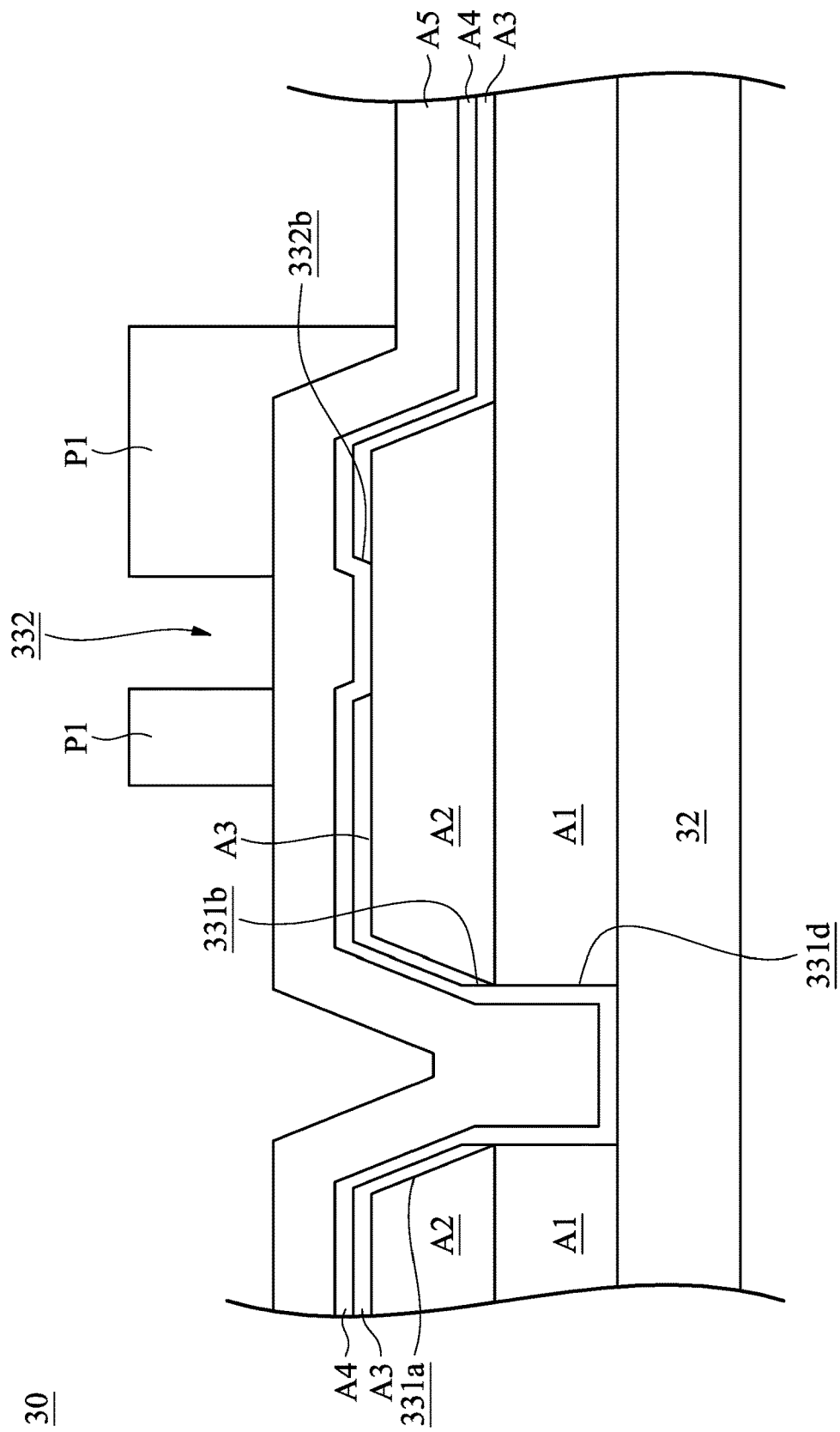
FIG. 10A and FIG. 10B are schematic views of the radiators during manufacturing intermediate stages in accordance with the fourth embodiment of the disclosure.
Figure 10B:
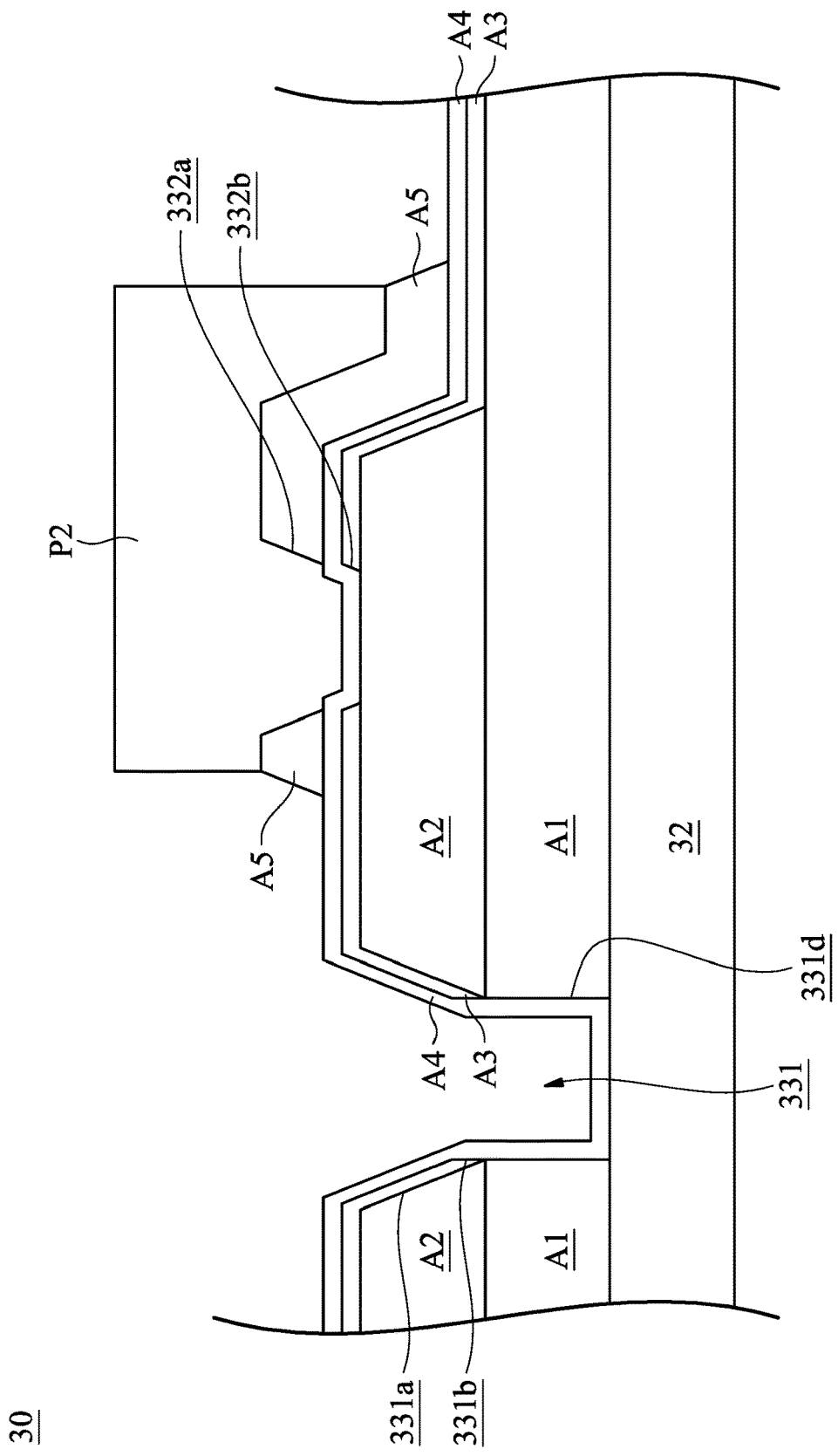

FIG. 10A and FIG. 10B are schematic views of the radiators 30 during manufacturing intermediate stages in accordance with the fourth embodiment of the disclosure. Please refer to the manufacturing methods of the described embodiments. As shown in FIG. 10A, the buffer layer A1, the patterned metal layer A2, and the insulation layer A3 are formed on the substrate 32 in sequence. The opening areas 331d and 331b and the through hole 332b are formed on the buffer layer A1 and the insulation layer A3.

The etch-stop layer A4 and the protective layer A5 are formed on the metal layer A2 and the insulation layer A3 in sequence. A portion of the etch-stop layer A4 and a portion of the protective layer A5 may be located in the opening areas 331b and 331d. The etch-stop layer A4 may be contact with the metal layer A2 in the through hole 332b. Afterwards, a patterned photoresist P1 is formed on the protective layer A5.

A portion of the protective layer A5 (as shown in FIG. 10B) uncovered by the photoresist P1 is removed by the first etching process. Afterwards, the photoresist P1 is removed.

As shown in FIG. 10B, a photoresist P2 is formed on the protective layer A5 and the through hole 332a. A portion of the etch-stop layer A4 uncovered by photoresist P2 is removed by the second etching process. Afterwards, the photoresist P2 is removed, so as to form the radiation-signal layer 33 as shown in FIG. 9.

Figure 11:
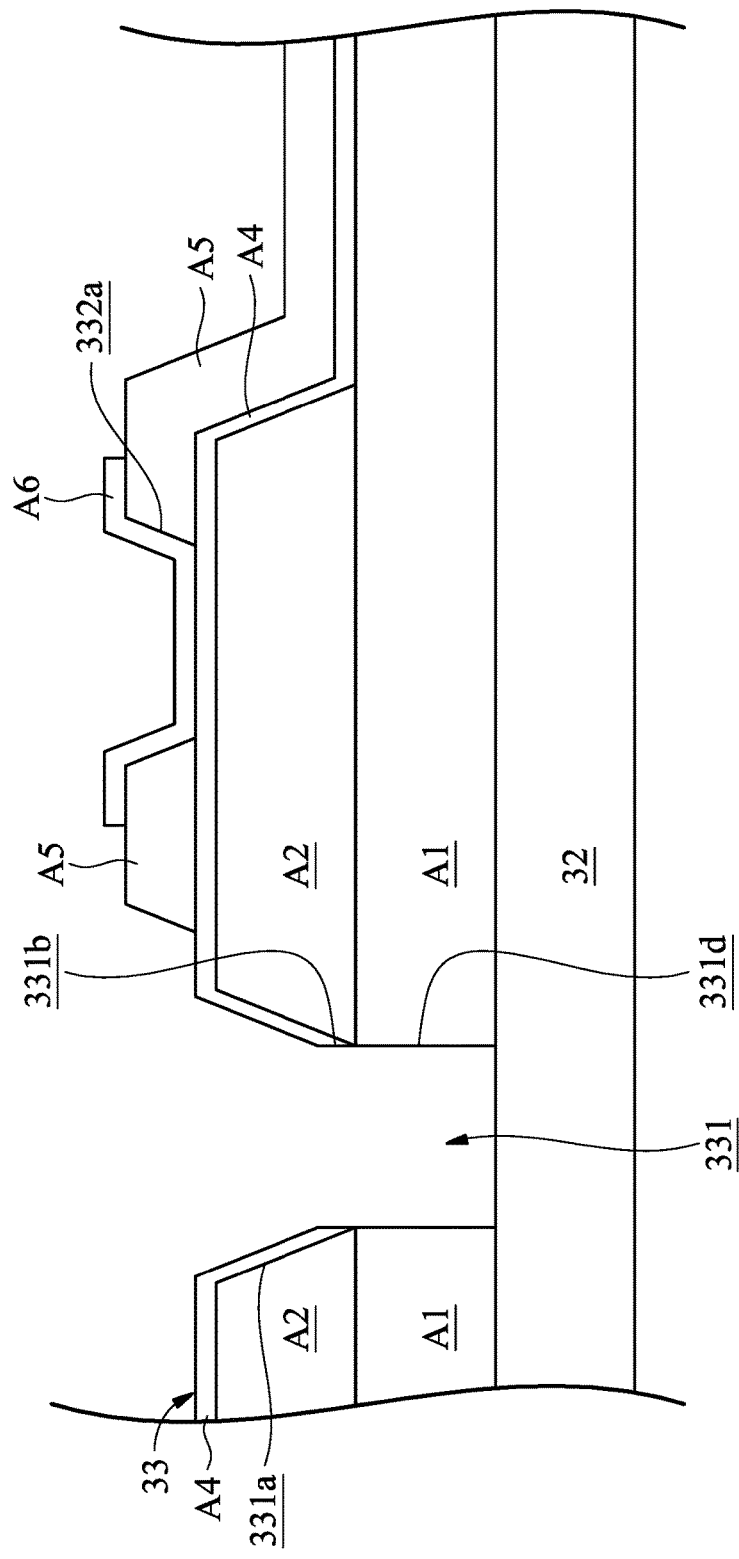
FIG. 11 is a schematic view of a radiator in accordance with a fifth embodiment of the disclosure.

FIG. 11 is a schematic view of a radiator 30 in accordance with a fifth embodiment of the disclosure. In this embodiment, the etch-stop layer A4 includes at least one metal material. Moreover, the materials of the etch-stop layer A4 are corrosion-resistant metal, such as Au, Pt, Pd, Ni, other suitable material for etch-stop layer, or a combination thereof, but it is not limited thereto. Since the materials of the etch-stop layer A4 may be corrosion-resistant metal, such as Au, the etch-stop layer A4 provides greatly protection to the metal layer A2, and the thickness of the protective layer A5 could be decreased.

In this embodiment, the thickness of the protective layer A5 is in a range from about 500 Å to 2000 Å. In some embodiments, the thickness of the protective layer A5 is about 1000 Å.

In this embodiment, the etch-stop layer A4 could completely cover the metal layer A2, or cover over 90% of the area of the metal layer A2. In this embodiment, the etch-stop layer A4 has the function as the insulation layer A3 protecting the metal layer A2 of described embodiments. Therefore, the radiation-signal layer 33 may not include the insulation layer A3.

Figure 12:
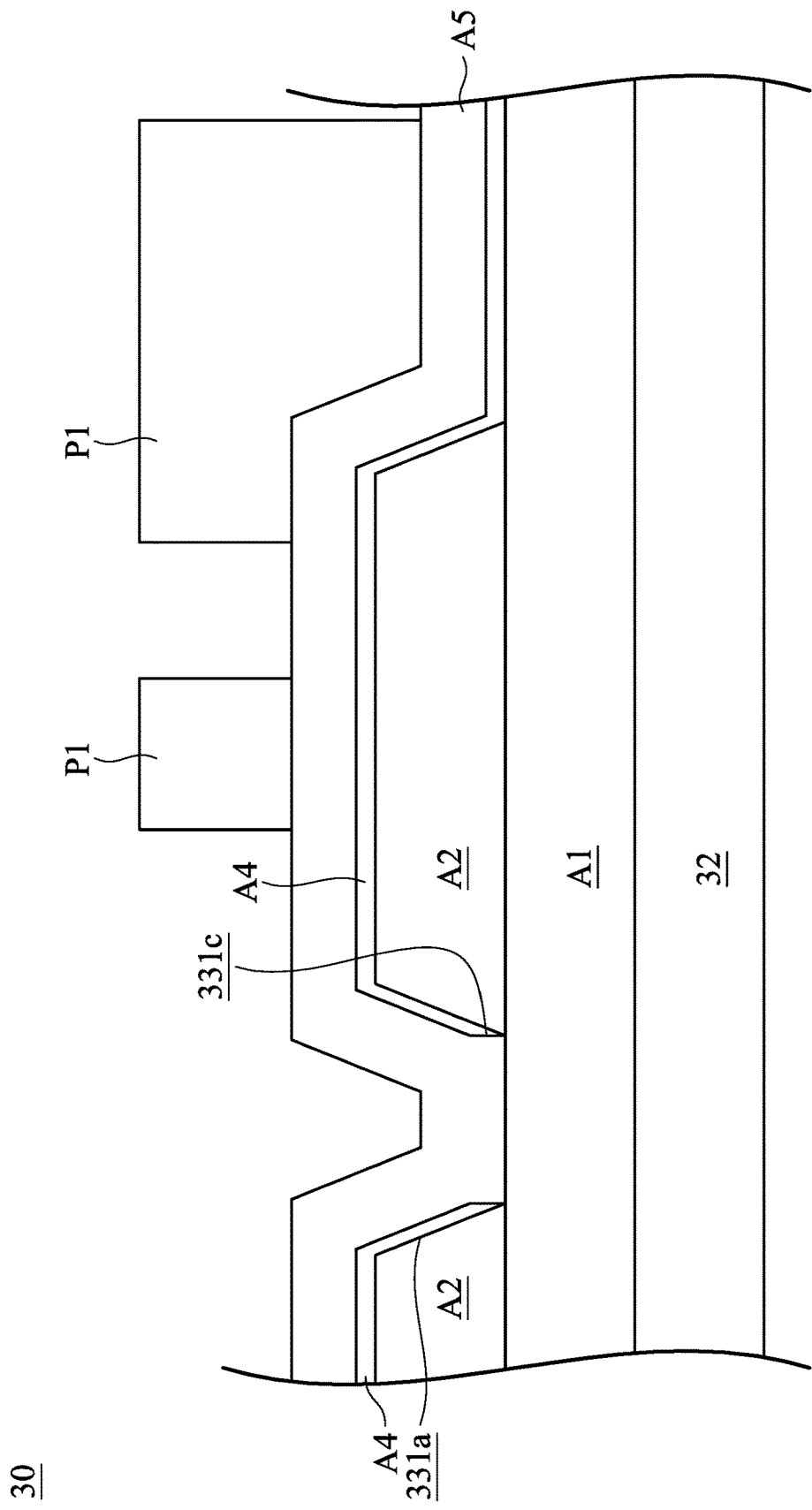
FIG. 12 is a schematic view of the radiator during manufacturing intermediate stage in accordance with the fifth embodiment of the disclosure.

FIG. 12 is a schematic view of the radiators 30 during manufacturing intermediate stage in accordance with the fifth embodiment of the disclosure. Please refer to the manufacturing method of the described embodiment. As shown in FIG. 12, the buffer layer A1, the patterned metal layer A2 are formed on the substrate 32 in sequence.

The etch-stop layer A4 is formed on the metal layer A2, and the etch-stop layer has an opening area 331c. As shown in FIG. 12, the etch-stop layer A4 is not located over a portion of the buffer layer A1 uncovered by the metal layer A2. Afterwards, the protective layer A5 is formed on the etch-stop layer A4 and the portion of the buffer layer A1 uncovered by the metal layer A2.

The photoresist P1 is formed on the protective layer A5. Afterwards, a portion of the protective layer A5 uncovered by the photoresist P1 is removed by the first etching process, so as to form a through hole 332a (as shown in FIG. 11). Next, the portion of the buffer layer A1 uncovered by the etch-stop layer A4 is removed. Afterwards, the photoresist P1 is removed, and the conductive layer A6 is formed on the protective layer A5 and the through hole 332a, so as to form the radiation-signal layer 33 as shown in FIG. 11. Moreover, a portion the conductive layer A6 in the through hole 332a is in contact with or in direct contact with the etch-stop layer A4.

Figure 13:
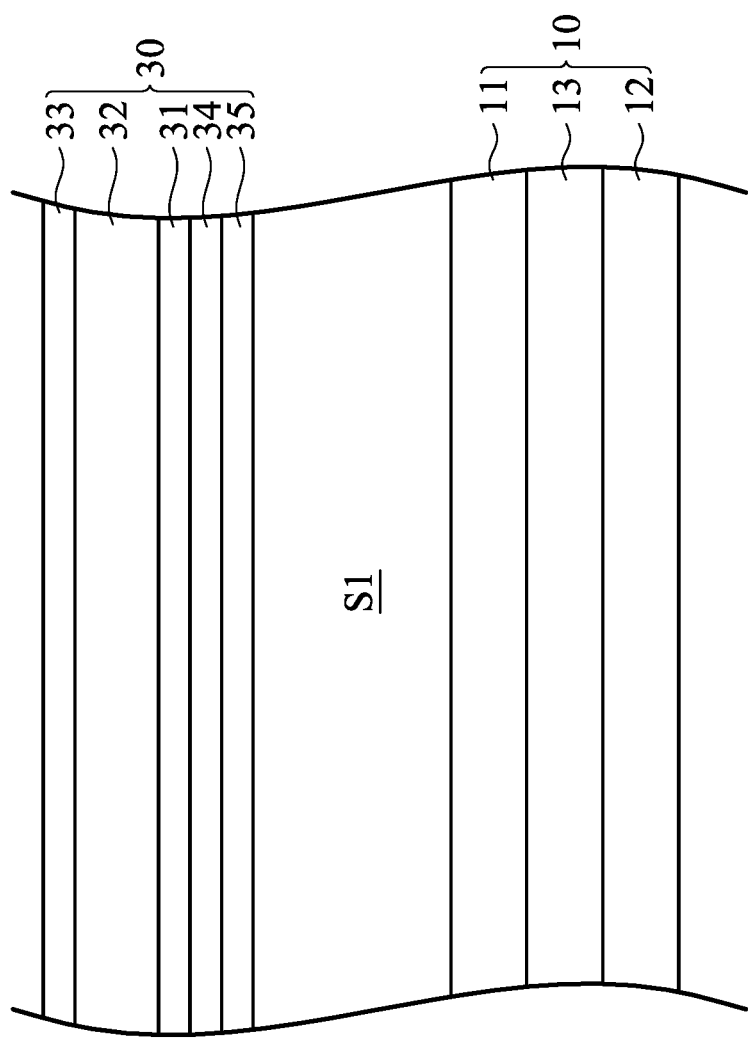
FIG. 13 is a schematic view of two radiators in accordance with some embodiments of the disclosure.

FIG. 13 is a schematic view of a radiator 10 and a radiator 30 in accordance with some embodiments of the disclosure. In this embodiment, the transmitting layer 12 is located under the substrate 11. The substrate 11 is located between the transmitting layer 12 and the microwave-transmission layer S1. An adhesive layer 13 is located between the substrate 11 and the transmitting layer 12, and thus the transmitting layer 12 can finely adhere to the substrate 11.

The radiator 30 further includes an adhesive layer 34 and a substrate 35. The substrate 35 is disposed on the microwave-transmission layer S1. The transmitting layer 31 is disposed on the substrate 35. An adhesive layer 34 is located between the substrate 35 and the transmitting layer 31, and thus the transmitting layer 31 can greatly adhere to the substrate 35.

The adhesive layers 13 and 34 may include insulation materials, such as $Al_2O_3$, but it is not limited thereto. During the microwave-transmission layer S1 transmitting the microwave signals, the current is concentrated in the transmitting layer 12 and the transmitting layer 31 due to the materials of the adhesive layers 13 and 34, and the amount of the current in the adhesive layers 13 and 34 is decreased. Therefore, the loss of the microwave signals is reduced.

Figure 14:
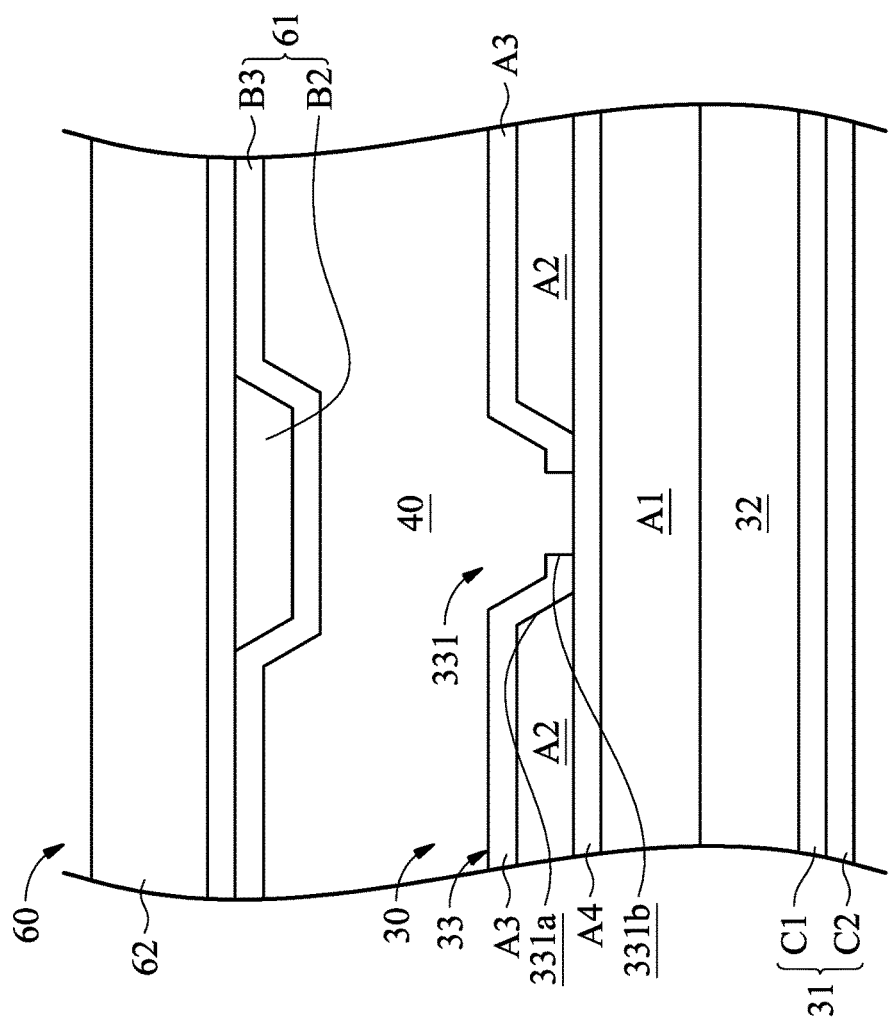
FIG. 14 is a schematic view of two radiators in accordance with some embodiment of the disclosure.

FIG. 14 is a schematic view of a radiator 30 and a radiator 60 in accordance with some embodiment of the disclosure. The transmitting layer C2 is disposed on a surface of the substrate 32. A buffer layer or another adhesive layer C1 can be selectively disposed between the transmitting layer C2 and the substrate 32, so as to connect the transmitting layer C2 and the substrate 32. The transmitting layer C2 includes metal materials.

The metal layer A2 is disposed on another surface of the substrate 32. The buffer layer A1 is disposed between the metal layer A2 and the substrate 32, and the etch-stop layer A4 is located between the buffer layer A1 and the metal layer A2. The insulation layer A3 is disposed on the metal layer A2. When an etching process performs on a portion of the insulation layer A3, the etch-stop layer A4 is configured to protect the buffer layer A1 thereunder, and thus no opening will be generated at a portion of the buffer layer A1 corresponding to the opening area 331b, the amount of the modulation structure 40 is decreased.

In conclusion, the protective layer and the etch-stop layer of the disclosure can greatly protect the layers thereunder, so as to improve the durability of the microwave modulation device, or saving the amount of modulation structure.

The disclosed features may be combined, modified, or replaced in any suitable manner in one or more disclosed embodiments, but are not limited to any particular embodiments.

While the disclosure has been described by way of example and in terms of preferred embodiment, it should be understood that the disclosure is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A microwave modulation device, comprising:
a first radiator comprising:
a substrate;
a metal layer disposed on the substrate;
a protective layer disposed on at least a portion of the metal layer, and having a through hole, wherein the through hole overlaps with a portion of the metal layer; and
an etch-stop layer disposed between the metal layer and the protective layer;
a second radiator disposed corresponding to the first radiator;
a sealing wall disposed between the first radiator and the second radiator; and
a modulation structure disposed between the first radiator and the second radiator.

2. The microwave modulation device as claimed in claim 1, wherein the first radiator further comprises an insulation layer disposed between the protective layer and the metal layer.

3. The microwave modulation device as claimed in claim 2, wherein a ratio of a thickness of the metal layer to a thickness of the protective layer is in a range from 4 to 25.

4. The microwave modulation device as claimed in claim 1, wherein a portion of the etch-stop layer is not overlaid on the protective layer.

5. The microwave modulation device as claimed in claim 1, wherein the first radiator further comprises a conductive layer disposed on the metal layer and extended into the through hole, wherein a portion of the conductive layer overlaps with the etch-stop layer.

6. The microwave modulation device as claimed in claim 5, wherein a portion of the etch-stop layer is located between the conductive layer and the metal layer.

7. The microwave modulation device as claimed in claim 5, wherein a portion of the conductive layer is disposed on the protective layer.

8. The microwave modulation device as claimed in claim 5, wherein a portion of the conductive layer is disposed between the etch-stop layer and the metal layer.

9. The microwave modulation device as claimed in claim 5, wherein a portion of the conductive layer is in direct contact with the metal layer.

10. The microwave modulation device as claimed in claim 1, wherein the etch-stop layer comprises at least one conductive material.

11. The microwave modulation device as claimed in claim 10, wherein the at least one conductive material comprises at least one transparent oxide material.

12. The microwave modulation device as claimed in claim 10, wherein the at least one conductive material comprises at least one metal material.

13. The microwave modulation device as claimed in claim 12, wherein a thickness of the protective layer is in a range from 500 angstrom to 2000 angstrom.

14. The microwave modulation device as claimed in claim 1, wherein an etching rate of the etch-stop layer is less than an etching rate of the protective layer.

15. The microwave modulation device as claimed in claim 1, wherein the sealing wall is a ring-shaped structure.

16. The microwave modulation device as claimed in claim 1, further comprising a buffer layer disposed between the substrate and the metal layer.

17. The microwave modulation device as claimed in claim 16, wherein the buffer layer comprises at least one insulation material.

18. The microwave modulation device as claimed in claim 17, wherein the at least one insulation material comprises aluminum oxide.

19. A microwave modulation device, comprising:
a first radiator comprising:
a substrate;
a buffer layer disposed on the substrate;
a metal layer disposed on the buffer layer;
a protective layer disposed on a portion of the metal layer, and having a through hole; and
an etch-stop layer disposed between the metal layer and the buffer layer;
a second radiator disposed corresponding to the first radiator; and
a modulation structure disposed between the first radiator and the second radiator,
wherein the through hole exposes a portion of the etch-stop layer.

* * * * *